(12) United States Patent
Jensen et al.

(10) Patent No.: US 7,294,599 B2
(45) Date of Patent: Nov. 13, 2007

(54) ACIDIC ACTIVATOR-SUPPORTS AND CATALYSTS FOR OLEFIN POLYMERIZATION

(75) Inventors: Michael D. Jensen, Bartlesville, OK (US); Gil R. Hawley, Dewey, OK (US); Max P. McDaniel, Bartlesville, OK (US); Tony Crain, Niotaze, KS (US); Elizabeth A. Benham, Spring, TX (US); Joel L. Martin, Bartlesville, OK (US); Qing Yang, Bartlesville, OK (US)

(73) Assignee: Chevron Phillips Chemical Co., The Woodlands, TX (US)

( * ) Notice: Subject to any disclaimer, the term of this patent is extended or adjusted under 35 U.S.C. 154(b) by 104 days.

(21) Appl. No.: 10/877,039

(22) Filed: Jun. 25, 2004

(65) Prior Publication Data

US 2005/0288178 A1 Dec. 29, 2005

(51) Int. Cl.
C08F 4/02 (2006.01)
C08F 4/6392 (2006.01)

(52) U.S. Cl. .................. 502/108; 502/103; 502/104; 502/120; 502/152; 526/129; 526/160; 526/943

(58) Field of Classification Search ............... 502/108, 502/120, 152, 103, 104; 526/129, 160, 943
See application file for complete search history.

(56) References Cited

U.S. PATENT DOCUMENTS

| | | | |
|---|---|---|---|
| 4,665,047 A | 5/1987 | Slaugh et al. | |
| 5,468,707 A | 11/1995 | Pohl et al. | |
| 5,498,581 A | 3/1996 | Welch et al. | |
| 5,565,592 A | 10/1996 | Patsidis et al. | |
| 5,576,259 A | 11/1996 | Hasegawa et al. | |
| 5,906,955 A | 5/1999 | Hamura et al. | |
| 5,912,202 A | 6/1999 | Oskam et al. | |
| 5,942,459 A | 8/1999 | Sugano et al. | |
| 6,002,037 A | 12/1999 | Nigishi et al. | |
| 6,034,187 A | 3/2000 | Maehama et al. | |
| 6,107,230 A | 8/2000 | McDaniel et al. | |
| 6,121,394 A | 9/2000 | Sugimoto et al. | |
| 6,165,929 A | 12/2000 | McDaniel et al. | |
| 6,184,170 B1 | 2/2001 | Chang | |
| 6,225,423 B1 | 5/2001 | Andell et al. | |
| 6,239,059 B1 | 5/2001 | Saudemont et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,340,652 B1 | 1/2002 | Sugano et al. | |
| 6,355,594 B1 | 3/2002 | McDaniel et al. | |
| 6,376,415 B1 | 4/2002 | McDaniel et al. | |
| 6,391,816 B1 | 5/2002 | McDaniel et al. | |
| 6,395,666 B1 | 5/2002 | McDaniel et al. | |
| 6,509,427 B1 | 1/2003 | Welch et al. | |
| 6,524,987 B1 | 2/2003 | Collins et al. | |
| 6,548,441 B1 | 4/2003 | McDaniel et al. | |
| 7,041,617 B2 * | 5/2006 | Jensen et al. ............... | 502/113 |
| 2002/0169072 A1 | 11/2002 | Nakayama et al. | |
| 2005/0288461 A1 * | 12/2005 | Jensen et al. ............... | 526/127 |
| 2005/0288462 A1 * | 12/2005 | Jensen et al. ............... | 526/127 |

FOREIGN PATENT DOCUMENTS

| | | |
|---|---|---|
| EP | 1325899 A1 | 7/2003 |
| WO | WO 97/27224 A1 | 7/1997 |
| WO | WO 9960033 A1 | 11/1999 |
| WO | WO 0123433 A1 | 4/2001 |
| WO | WO 0123434 A1 | 4/2001 |
| WO | WO 0141920 A1 | 6/2001 |
| WO | WO 0144309 A1 | 6/2001 |
| WO | WO 0158587 A1 | 8/2001 |
| WO | WO 0183498 A1 | 11/2001 |
| WO | WO 0190239 A1 | 11/2001 |
| WO | WO 2005/068519 A2 | 7/2005 |

OTHER PUBLICATIONS

Shida, M., et al.; Correlation of Low Density Polyethylene Rheological Measurements with Optical and Processing Properties, Polymer Engineering and Science, Nov. 1977, pp. 769-774, vol. 17, No. 11, The Society of Plastics Engineers, Inc.

Arnett, R. L.; Thomas, C. P., Zero-Shear Viscosity of Some Ethyl Branched Paraffinic Model Polymers, Journal of Physical Chemistry, 1980, pp. 649-652, vol. 84, No. 6, American Chemical Society.

Alt, H. G.; Zenk, R., Syndiospezifische Polymerisation von Propylen: 2- und 2. 7-substituierte Metallocenkomplex des Typs $(C_{13}H_{8-n}R_nCR'_2C_5H_4)$ $MCl_2(n=1, 2; R=Alkoxy, Alkyl, Aryl, Hal; R'=Me, Ph; M=Zr, Hf)$, Journal of Organometallic Chemistry, 1996, pp. 39-54, vol. 522.

Kajigaeshi, S.; Kadowaki, T.; Nishida, A.; Fujisaki, S., Selective Preparation of Fluorene Derivatives Using the t-Butyl Function as a Positional Protective Group, Bull. Chem. Soc. Jpn., Jan. 1986, pp. 97-103, vol. 59, The Chemical Society of Japan.

Alt, H. G.; Jung, M.; Kehr, G., $C_1$-verbrückte Fluorenyliden-Indenylidenkomplexe des Typs $(C_{13}H_8-CR_2-C_9H_{6-n}R'_n)ZrCl_2$ ($n=0$, 1; R=Me, Ph, Butenyl; R'=Alkyl, Alkenyl) als Metallocenkatalysatorvorstufen für die Ethylenpolymerisation, Journal of Organometallic Chemistry, 1998, pp. 153-181, vol. 562, Elsevier Science S.A.

Kolodka, E., et al., Long-Chain Branching in Slurry Polymerization of Ethylene with Zirconocene Dichloride/Modified Methylaluminoxane, Polymer, 2000, pp. 3985-3991, vol. 41, Elsevier Science Ltd.

Villar, M. A. et al.; Rheological Characterization of Molten Ethylene-α-Olefin Copolymers Synthesized with $Et[Ind]_2ZrCl_2$/ MAO Catalyst, Polymer, 2001, pp. 9269-9279, vol. 42, No. 22, Elsevier Science Ltd.

Koppl, A.; Alt, H. G., Heterogeneous Metallocene Catalysts for Ethylene Polymerization, Journal of Molecular Catalysis A: Chemical, 2001, pp. 23-32, vol. 165, Elsevier Science B.V.

(Continued)

*Primary Examiner*—Caixia Lu
(74) *Attorney, Agent, or Firm*—Merchant & Gould

(57) ABSTRACT

This invention relates to the field of olefin polymerization catalyst compositions, and methods for the polymerization and copolymerization of olefins, typically using a supported catalyst composition. In one aspect, this invention encompasses precontacting a metallocene with an olefin or alkyne monomer and an organoaluminum compound, prior to contacting this mixture with the acidic activator-support.

28 Claims, No Drawings

OTHER PUBLICATIONS

Walter, P., et al., Influence of Zirconocene Structure and Propene Content on Melt Rheology of Polyethene and Ethene/Propene Copolymers, Polymer Bulletin, 2001, pp. 205-213, vol. 46, Springer-Verlag.

Sukhadia, A. M., The Complex Effects of Long Chain Branching on the Blown Film Performance of LLDPE Resins, ANTEC, May 2002, pp. 1481-1486, Society of Plastics Engineers.

Malmberg, A., et al., Long-Chain Branching in Metallocene-Catalyzed Polyethylenes Investigated by Low Oscillatory Shear and Uniaxial Extensional Rheometry, Macromolecules, 2002, pp. 1038-1048. vol. 35, American Chemical Society.

Podzimek, S., A Review of the Analysis of Branched Polymers by SEC-MALS, American Laboratory, Jan. 2002, pp. 38-45.

Alt, H. G.; Jung, M.; , $C_1$-Bridged Fluorenylidene Cyclopentadienylidene Complexes of the type $(C_{13}\text{-}H_8\text{-}CR^1R^2\text{-}C_5H_3R)ZrCl_2$ ($R^1$, $R^2$=alkyl, phenyl, alkenyl; R=H, alkyl, alkenyl, subsituted silyl) as Catalyst Precursors for the Polymerization of Ethylene and Propylene, Journal of Organometallic Chemistry, 1998, pp. 87-112, vol. 568, Elsevier Science S.A.

Dzhemilev, U. M.; Ibragimov, A. G., Regio- and Stereoselective Synthesis for a Novel Class of Organoaluminium Compounds—Substituted Aluminacyclopentanes and Aluminacyclopentenes Assisted by Zirconium Catalysts, Journal of Organometallic Chemistry, 1994, pp. 1-4, 466.

Rytter E, et al; "Supported Metallocene Catalysts Prepared by Impregnation of Silica With Metallocene/Aluminoxane/1-Hexene Solutions"; Macromolecular: Rapid Communications; vol. 22, No. 17; Dec. 11, 2001; pp. 1427-1437.

Kamfjord T et al.; "Supprted Metallocene Catlyst Prepared by Impgregnation of MAO-modified Silica by a Metallocene/Monomer Solution"; Macromolecular: Rapid Communications; vol. 19, 1998; pp. 505-509.

* cited by examiner

ACIDIC ACTIVATOR-SUPPORTS AND CATALYSTS FOR OLEFIN POLYMERIZATION

TECHNICAL FIELD OF THE INVENTION

This invention relates to the field of olefin polymerization catalyst compositions, methods for the polymerization of olefins, and olefin polymers.

BACKGROUND OF THE INVENTION

It is known that mono-1-olefins (α-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher α-olefins. Therefore, there exists a constant search to develop new olefin polymerization catalysts, catalyst activation processes, and methods of making and using catalysts that will provide enhanced catalytic activities and polymeric materials tailored to specific end uses.

One type of catalyst system comprises organometal compounds, particularly metallocene compounds. It is known that contacting water with trimethylaluminum under appropriate conditions forms methyl aluminoxane, and subsequently contacting methyl aluminoxane with a metallocene compound forms a metallocene polymerization catalyst. However, in order to achieve the desired high polymerization activities, large amounts of methyl aluminoxane, and hence large amounts of expensive trimethylaluminum, are necessary to form the active metallocene catalysts. This feature has been an impediment to the commercialization of metallocene catalyst systems, therefore improvements in catalyst compositions and in methods of making the catalyst are needed to afford the desired high polymerization activities.

What are needed are new catalyst compositions and methods of making the catalyst compositions that afford high polymerization activities, and will allow polymer properties to be maintained within the desired specification ranges. One method to achieve this goal is to develop new polymerization methods that provide and utilize catalysts of sufficiently high activity as to be commercially viable.

SUMMARY OF THE INVENTION

This invention comprises catalyst compositions, methods for preparing catalyst compositions, and methods for polymerizing olefins and acetylenes using the catalyst compositions. In the course of examining metallocene olefin polymerization catalysts, it was discovered that increased activity in metallocene catalyst compositions could be achieved by precontacting the metallocene compound with an alkene or alkyne monomer and an organoaluminum cocatalyst for some period of time before the mixture is contacted with an acidic activator-support.

The mixture of at least one metallocene, alkene or alkyne monomer, and organoaluminum cocatalyst compound, before it is contacted with the activator-support, is termed the "precontacted" mixture. The mixture of metallocene, monomer, organoaluminum cocatalyst, and activator-support, formed from contacting the precontacted mixture with the acidic activator-support, is termed the "postcontacted" mixture. This terminology is used regardless of what type of reaction occurs between components of the mixtures. For example, according to this description, it is possible for the precontacted organoaluminum compound, once it is admixed with the metallocene or metallocenes and the olefin or alkyne monomer, to have a different chemical formulation and structure from the distinct organoaluminum compound used to prepare the precontacted mixture. Accordingly, the metallocene, the organoaluminum compound, the olefin or alkyne, and the acidic activator-support, whether precontacted or postcontacted, are described according to the corresponding metallocene, organoaluminum compound, olefin or alkyne, and acidic activator-support used to contact the other components in preparing the precontacted or postcontacted mixtures.

Therefore, in one aspect, the catalyst composition of this invention comprises: at least one precontacted metallocene; at least one precontacted organoaluminum compound; at least one precontacted olefin or alkyne; and at least one postcontacted acidic activator-support.

In another aspect, the precontacted metallocene comprises a compound having the following formula:

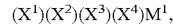

wherein $M^1$ is selected from titanium, zirconium, or hafnium;

wherein $(X^1)$ is independently selected from cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

wherein at least one substituent on $(X^1)$ is optionally a bridging group that connects $(X^1)$ and $(X^2)$;

wherein $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

wherein $(X^2)$ is independently selected from a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;

wherein each substituent on the substituted $(X^2)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; and wherein at least one substituent on $(X^2)$ is optionally a bridging group that connects $(X^1)$ and $(X^2)$.

In another aspect of this invention, the precontacted organoaluminum compound comprises an organoaluminum compound with the following formula:

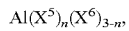

$$Al(X^5)_n(X^6)_{3-n},$$

wherein $(X^5)$ is a hydrocarbyl having from 2 to about 20 carbon atoms; $(X^6)$ is selected from alkoxide or aryloxide, any one of which having from 1 to about 20 carbon atoms, halide, or hydride; and n is a number from 1 to 3, inclusive.

In still another aspect of the invention, the precontacted olefin or alkyne comprises a compound having from 2 to about 30 carbon atoms per molecule and having at least one carbon-carbon double bond or at least one carbon-carbon triple bond.

Yet another aspect of this invention is the postcontacted acidic activator-support which comprises a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

In one aspect of this invention, for example, the metallocene compound comprises a zirconium metallocene such as bis(indenyl)zirconium dichloride ($Ind_2ZrCl_2$) or bis(cyclopentadienyl)zirconium dichloride ($Cp_2ZrCl_2$), which is employed along with triethylaluminum cocatalyst and a fluoride-treated silica-alumina acidic activator-support. The activator-support of this invention, of which fluorided silica-alumina is one example, exhibits enhanced acidity as compared to the corresponding untreated solid oxide compound. The activator-support also functions as a catalyst activator as compared to the corresponding untreated solid oxide. Accordingly, the acidic activator-support functions as an "activator" because it is not merely an inert support component of the catalyst composition, but is involved in effecting the observed catalytic chemistry.

In another aspect of this invention, for example, precontacting a metallocene compound with 1-hexene and triethylaluminum, typically for at least about 10 minutes, prior to contacting this mixture with the acidic activator-support such as fluorided silica-alumina, the productivity of the subsequent olefin polymerization was increased by several-fold as compared to a catalyst composition using the same components, but without a precontacting step. The enhanced activity catalyst composition of this invention can be used for homopolymerization of an α-olefin monomer, for copolymerization of an α-olefin and a comonomer, and for polymerization of alkynes as well.

This invention also comprises methods of making catalyst compositions that utilize at least one metallocene catalyst, at least one organoaluminum compound as cocatalysts, and an acidic activator-support. The methods of this invention comprise precontacting the metallocene catalyst and an organoaluminum cocatalyst with an olefin or alkyne compound typically, but not necessarily, a monomer to be polymerized or copolymerized, prior to contacting this precontacted mixture with the acidic activator-support. Such methods allow for, among other things, attaining a high polymerization activity and productivity.

Thus, in one aspect, this invention provides a process to produce a catalyst composition, comprising:

contacting at least one metallocene, at least one organoaluminum compound, and at least one olefin or alkyne for a first period of time to form a precontacted mixture comprising at least one precontacted metallocene, at least one precontacted organoaluminum compound, and at least one precontacted olefin or alkyne; and contacting the precontacted mixture with at least one acidic activator-support for a second period of time to form a postcontacted mixture comprising at least one postcontacted metallocene, at least one postcontacted organoaluminum compound, at least one postcontacted olefin or alkyne, and at least one postcontacted acidic activator-support.

Further, this invention encompasses a catalyst composition that comprises cyclic organoaluminum compounds, particularly aluminacyclopentanes, that derive from precontacting an organoaluminum cocatalyst with an unsaturated compound. This invention also comprises a method of preparing a catalyst composition which generates cyclic organoaluminum compounds from precontacting an organoaluminum cocatalyst with an unsaturated compound.

The present invention further comprises new catalyst compositions, methods for preparing catalyst compositions, and methods for polymerizing olefins or alkynes that result in improved productivity, without the need for using large excess concentrations of expensive organoaluminum cocatalysts.

Additionally, this invention encompasses a process comprising contacting at least one monomer and the catalyst composition under polymerization conditions to produce the polymer. Thus, this invention comprises methods for polymerizing olefins and alkynes using the catalyst compositions prepared as described herein.

This invention also comprises an article that comprises the polymer produced with the catalyst composition of this invention.

These and other features, aspects, embodiments, and advantages of the present invention will become apparent after a review of the following detailed description of the disclosed features.

The following patent applications, filed contemporaneously with the present application, are incorporated by reference herein in their entireties: U.S. patent application Ser. Nos. 10/876.891 10/876,930; 10/876,948, now U.S. Pat. No. 7.064,225; and U.S. patent application Ser. No. 10/877,021.

DETAILED DESCRIPTION OF THE INVENTION

The present invention provides new catalyst compositions, methods for preparing catalyst compositions, and methods for using the catalyst compositions to polymerize olefins and acetylenes. In one aspect, the catalyst composition of this invention comprises: at least one precontacted metallocene; at least one precontacted organoaluminum compound; at least one precontacted olefin or alkyne; and at least one postcontacted acidic activator-support.

In yet another aspect, the present invention provides a catalyst composition comprising an optional cocatalyst in addition to the precontacted metallocene, precontacted organoaluminum compound, precontacted olefin or alkyne, and postcontacted acidic activator-support. In one aspect, the optional cocatalyst may be selected from at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

In still another aspect, this invention provides a process to produce a catalyst composition, comprising:

contacting a metallocene, an organoaluminum compound, and an olefin or alkyne for a first period of time to form a precontacted mixture comprising a precontacted metallocene, a precontacted organoaluminum compound, and a precontacted olefin or ethylene; and contacting the precontacted mixture with a acidic activator-support for a second period of time to form a postcontacted mixture comprising a postcontacted metallocene, a postcontacted organoaluminum compound, a postcontacted olefin or alkyne, and a postcontacted acidic activator-support.

Catalyst Compositions and Components

The Metallocene Compound

The present invention provides catalyst compositions comprising at least one metallocene compound, at least one organoaluminum compound, at least one olefin or alkyne, and at least one acidic activator-support. In one aspect, the metallocene compound and the organoaluminum compound are precontacted with the olefin or alkyne to form a precontacted mixture, prior to contacting this precontacted mixture with the acidic activator-support. The metallocene compound may comprise a metallocene compound of titanium, zirconium, and hafnium.

In one aspect, the metallocene compound that is used to prepare the precontacted mixture, comprises a compound having the following formula:

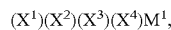

wherein $M^1$ is selected from titanium, zirconium, or hafnium;

wherein $(X^1)$ is independently selected from cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

wherein at least one substituent on $(X^1)$ is optionally a bridging group that connects $(X^1)$ and $(X^2)$;

wherein $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

wherein $(X^2)$ is independently selected from a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;

wherein each substituent on the substituted $(X^2)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; and wherein at least one substituent on $(X^2)$ is optionally a bridging group that connects $(X^1)$ and $(X^2)$.

In one aspect, the following groups may be independently selected as substituents on $(X^1)$ and $(X^2)$, or may be independently selected as the $(X^2)$, $(X^3)$, or $(X^4)$ ligand themselves: an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; as long as these groups do not terminate the activity of the catalyst composition. This list includes substituents that may be characterized in more than one of these categories such as benzyl. Further, hydrogen may be selected as a substituent on $(X^1)$ and $(X^2)$, as long as this groups do not terminate the activity of the catalyst composition, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these groups include, but are not limited to, the following groups. In each example presented below, unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. Also included in these groups are any unsubstituted, branched, or linear analogs thereof.

Examples of aliphatic groups, in each instance, include, but are not limited to, an alkyl group, a cycloalkyl group, an alkenyl group, a cycloalkenyl group, an alkynyl group, an alkadienyl group, a cyclic aliphatic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance, include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, and the like, including any heteroatom substituted derivative thereof.

Examples of cyclic groups, in each instance, include, but are not limited to, cycloparaffins, cycloolefins, cycloalkynes, aryl groups such as phenyl, bicyclic groups and the like, including substituted derivatives thereof, in each instance having from about 3 to about 20 carbon atoms. Thus heteroatom-substituted cyclic groups such as furanyl are included herein. Also included herein are cyclic hydrocarbyl groups such as aryl, cycloalkyl, cycloalkenyl, cycloalkadienyl, aralkyl, aralkenyl, aralkynyl, and the like.

In each instance, aliphatic and cyclic groups are groups comprising an aliphatic portion and a cyclic portion, examples of which include, but are not limited to, groups such as: —$(CH_2)_m C_6 H_q R_{5-q}$ wherein m is an integer from 1 to about 10, q is an integer from 1 to 5, inclusive; $(CH_2)_m C_6 H_q R_{10-q}$ wherein m is an integer from 1 to about 10, q is an integer from 1 to 10, inclusive; and $(CH_2)_m C_5 H_q R_{9-q}$ wherein m is an integer from 1 to about 10, q is an integer from 1 to 9, inclusive. In each instance and as defined above, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. In one aspect, aliphatic and cyclic groups include, but are not limited to: —$CH_2 C_6 H_5$; —$CH_2 C_6 H_4 F$; —$CH_2 C_6 H_4 Cl$; —$CH_2 C_6 H_4 Br$; —$CH_2 C_6 H_4 I$; —$CH_2 C_6 H_4 OMe$; —$CH_2 C_6 H_4 OEt$; —$CH_2 C_6 H_4 NH_2$; —$CH_2 C_6 H_4 NMe_2$; —$CH_2 C_6 H_4 NEt_2$; —$CH_2 CH_2 C_6 H_5$; —$CH_2 CH_2 C_6 H_4 F$; —$CH_2 CH_2 C_6 H_4 Cl$; —$CH_2 CH_2 C_6 H_4 Br$; —$CH_2 CH_2 C_6 H_4 I$; —$CH_2 CH_2 C_6 H_4 OMe$; —$CH_2 CH_2 C_6 H_4 OEt$; —$CH_2 CH_2 C_6 H_4 NH_2$; —$CH_2 CH_2 C_6 H_4 NMe_2$; —$CH_2 CH_2 C_6 H_4 NEt_2$; any regioisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups (—OR), —OC(O)R, —OC(O)H, —$OSiR_3$, —$OPR_2$, —$OAlR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, —$OSO_2 R$, —$OSO_2 OR$, —SCN, —$SO_2 R$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to, —$NH_2$, —NHR, —$NR_2$, —$NO_2$, —$N_3$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —$PH_2$, —PHR, —$PR_2$, —$P(O)R_2$, —$P(OR)_2$, —$P(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, arsenic groups are arsenic-containing groups, which include, but are not limited to, —AsHR, —$AsR_2$, —$As(O)R_2$, —$As(OR)_2$, —$As(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with 1 to about 20 carbon atoms, —C(O)H, —C(O)R, —C(O)OR, cyano, —C(NR)H, —C(NR)R, —C(NR)OR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, lead groups are lead-containing groups, which include, but are not limited to, alkyllead groups, aryllead groups, arylalkyllead groups, and the like, which in each instance, have from 1 to about 20 carbon atoms.

In each instance, boron groups are boron-containing groups, which include, but are not limited to, —$BR_2$, —$BX_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

In each instance, aluminum groups are aluminum-containing groups, which include, but are not limited to, —$AlR_2$, —$AlX_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each instance, include, but are not limited to, —$SO_2X$, —$OAlX_2$, —$OSiX_3$, —$OPX_2$, —SX, —$OSO_2X$, —$AsX_2$, —$As(O)X_2$, —$PX_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organotransition metal groups, and the like, having from 1 to about 20 carbon atoms.

In one aspect of this invention, ($X^3$) and ($X^4$) are selected from halides or hydrocarbyls having from 1 to about 10 carbon atoms. More typically, ($X^3$) and ($X^4$) are selected from fluoro, chloro, or methyl.

In another aspect, because of the selections possible for ($X^1$) and ($X^2$), the metallocene of this invention can comprise a monokis(cyclopentadienyl) compound, a bis(cyclopentadienyl) compound, a monokis(indenyl) compound, a bis(indenyl) compound, a monokis(fluorenyl) compound, a bis(fluorenyl) compound, a (cyclopentadienyl)(indenyl) compound, a (cyclopentadienyl)(fluorenyl) compound, an (indenyl)(fluorenyl) compound, substituted analogs thereof, bridged analogs thereof, and the like. Thus, at least one substituent on ($X^2$) is optionally a bridging group that connects ($X^1$) and ($X^2$).

In one aspect of the invention, ($X^1$) is independently selected from cyclopentadienyl, indenyl, fluorenyl, boratabenzene, substituted cyclopentadienyl, substituted indenyl, substituted fluorenyl, or substituted boratabenzene; and ($X^2$) is independently selected from a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; as long as these groups do not terminate the activity of the catalyst composition.

At least one substituent on ($X^1$) or ($X^2$) may optionally be a bridging group that connects or bridges the ($X^1$) and ($X^2$) ligands, as long as the bridging group does not terminate the activity of the catalyst composition. The linkage that connects ($X^1$) and ($X^2$), that is, the shortest link of the bridging moiety, can be a single atom selected from carbon, silicon, germanium, or tin atom. In one aspect, the bridging atom is a carbon or silicon atom, in which case the bridge comprises a substituted methylene (or methylidene) group or a substituted silylene group. In another aspect, the linkage that connects ($X^1$) and ($X^2$), that is, the shortest link of the bridging moiety, can be from 2 to about 4 atoms. In yet another aspect, the linkage that connects ($X^1$) and ($X^2$), that is, the shortest link of the bridging moiety, can comprise from 2 to about 4 carbon atoms.

In another aspect, examples of bridging groups include, but are not limited to, aliphatic groups, cyclic groups, combinations of aliphatic groups and cyclic groups, phosphorous groups, nitrogen groups, organometallic groups, silicon, phosphorus, boron, germanium, and the like. Examples of aliphatic groups that can serve as bridges between ($X^1$) and ($X^2$) include, but are not limited to, hydrocarbyls, such as paraffins and olefins. Examples of cyclic groups that can serve as bridges between ($X^1$) and ($X^2$) include, bur are not limited to, cycloparaffins, cycloolefins, cycloalkynes, arenes, and the like. Examples of organometallic groups that can serve as bridges between ($X^1$) and ($X^2$) include, but are not limited to, substituted silyl derivatives, substituted tin groups, substituted germanium groups, substituted boron groups, and the like.

In another aspect, the optional bridging group may be substituted by at least one substituent, wherein the substituent may be independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

Numerous processes to prepare organometal compounds that can be employed in this invention, particularly metallocenes, have been reported. For example, U.S. Pat. Nos. 4,939,217, 5,210,352, 5,436,305, 5,401,817, 5,631,335, 5,571,880, 5,191,132, 5,399,636, 5,565,592, 5,347,026, 5,594,078, 5,498,581, 5,496,781, 5,563,284, 5,554,795, 5,420,320, 5,451,649, 5,541,272, 5,705,578, 5,631,203, 5,654,454, 5,705,579, and 5,668,230 describe such methods, each of which is incorporated by reference herein, in its entirety. Other processes to prepare metallocene compounds that can be employed in this invention have been reported in references such as: Köppl, A. Alt, H. G. *J. Mol. Catal A.* 2001, 165, 23; Kajigaeshi, S.; Kadowaki, T.; Nishida, A.; Fujisaki, S. *The Chemical Society of Japan,* 1986, 59, 97; Alt, H. G.; Jung, M.; Kehr, G. *J. Organomet. Chem.* 1998, 562, 153-181; and Alt, H. G.; Jung, M. *J. Organomet. Chem.* 1998, 568, 87-112; each of which is incorporated by reference herein, in its entirety. Further, additional processes to prepare metallocene compounds that can be employed in this invention have been reported in: *Journal of Organometallic Chemistry,* 1996, 522, 39-54, which is incorporated by reference herein, in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986; each of which is incorporated by reference herein, in its entirety.

In one aspect of this invention, the metallocene compounds of the present invention include, but are not limited to the following compounds:

bis(cyclopentadienyl)hafnium dichloride,

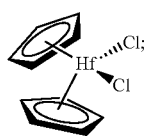

bis(cyclopentadienyl)zirconium dichloride,

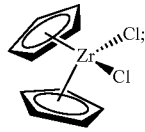

1,2-ethanediylbis($\eta^5$-1-indenyl)di-n-butoxyhafnium,

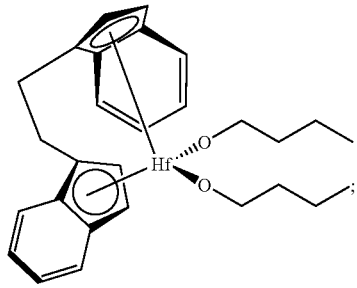

1,2-ethanediylbis($\eta^5$-1-indenyl)dimethylzirconium,

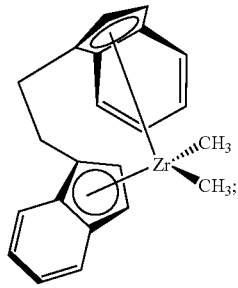

3,3-pentanediylbis($\eta^5$-4,5,6,7-tetrahydro-1-indenyl)hafnium dichloride,

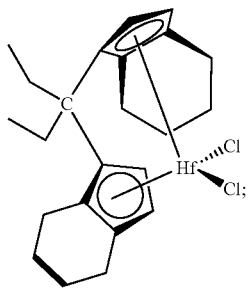

methylphenylsilylbis($\eta^5$-4,5,6,7-tetrahydro-1-indenyl)zirconium dichloride,

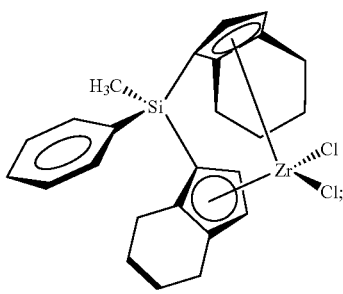

bis(n-butylcyclopentadienyl)bis(t-butylamido)hafnium,

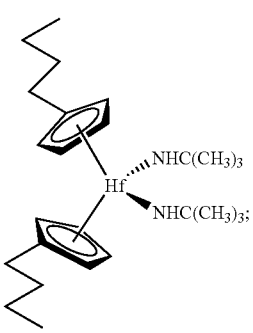

bis(1-n-butyl-3-methyl-cyclopentadienyl)zirconium dichloride;

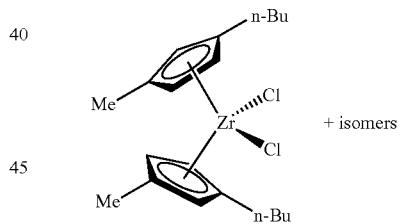

bis(n-butylcyclopentadienyl)zirconium dichloride,

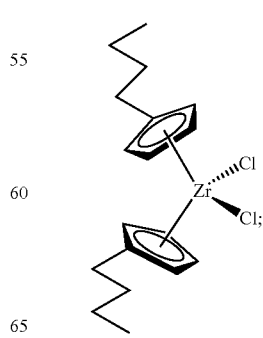

dimethylsilylbis(1-indenyl)zirconium dichloride,

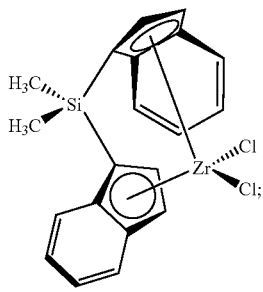

octyl(phenyl)silylbis(1-indenyl)hafnium dichloride,

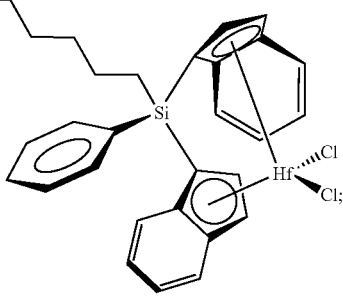

dimethylsilylbis($\eta^5$-4,5,6,7-tetrahydro-1-indenyl)zirconium dichloride,

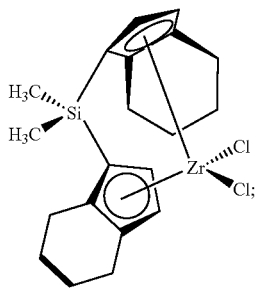

dimethylsilylbis(2-methyl-1-indenyl)zirconium dichloride,

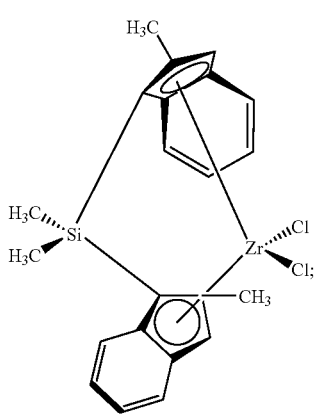

1,2-ethanediylbis(9-fluorenyl)zirconium dichloride,

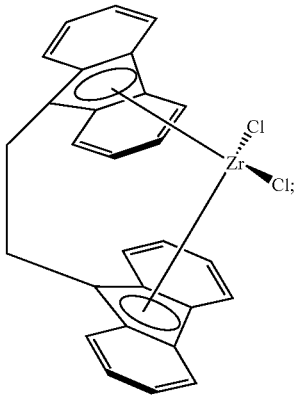

indenyl diethoxy titanium(IV) chloride,

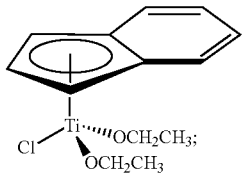

(isopropylamidodimethylsilyl)cyclopentadienyltitanium dichloride,

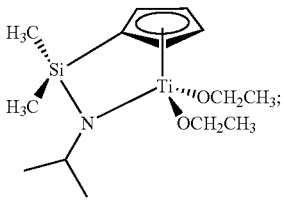

bis(pentamethylcyclopentadienyl)zirconium dichloride,

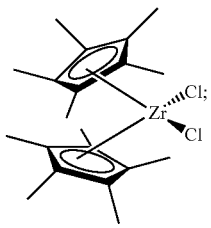

bis(indenyl) zirconium dichloride,

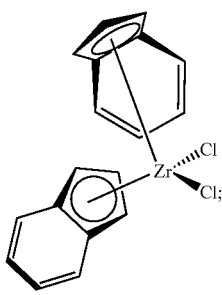

methyl(octyl)silylbis(9-fluorenyl)zirconium dichloride,

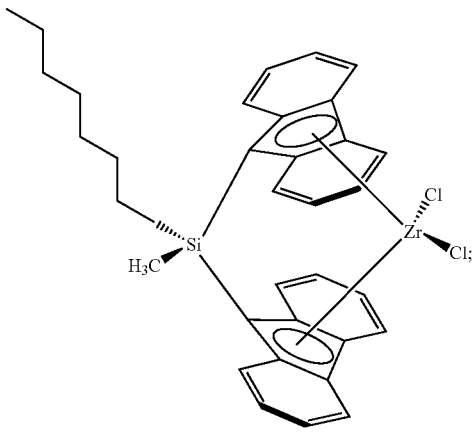

bis(2,7-di-tert-butylfluorenyl)-ethan-1,2-diyl)zirconium(IV) dichloride,

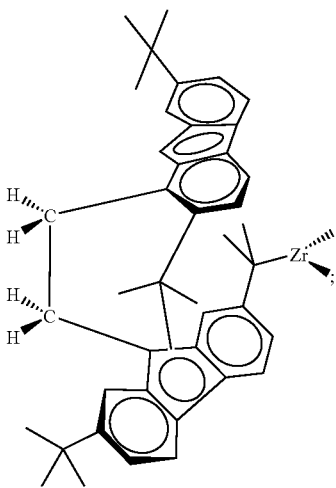

bis-[1-(N,N-diisopropylamino)boratabenzene]hydridozirconium trifluoromethylsulfonate,

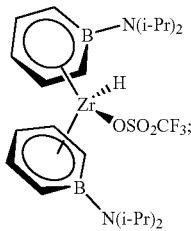

methyl-3-butenylmethylidene($\eta^5$-cyclopentadienyl)($\eta^5$-9-fluorenyl)zirconium dichloride, [($\eta^5$-C$_5$H$_4$)CCH$_3$(CH$_2$CH$_2$CH=CH$_2$)($\eta^5$-9-C$_{13}$H$_9$)]ZrCl$_2$;

methyl-3-butenylmethylidene($\eta^5$-cyclopentadienyl) ($\eta^5$-2,7-di-t-butyl-9-fluorenyl)zirconium dichloride, [($\eta^5$-C$_5$H$_4$)CCH$_3$(CH$_2$CH$_2$CH=CH$_2$)($\eta^5$-9-C$_{13}$H$_7$-2,7-$^t$Bu$_2$)]ZrCl$_2$;

methyl-4-pentenylmethylidene($\eta^5$-cyclopentadienyl)($\eta^5$-9-fluorenyl)zirconium dichloride, [($\eta^5$-C$_5$H$_4$)CCH$_3$(CH$_2$CH$_2$CH$_2$CH=CH$_2$)($\eta^5$-9-C$_{13}$H$_9$)]ZrCl$_2$;

methyl-4-pentenylmethylidene($\eta^5$-cyclopentadienyl)(15-2,7-di-t-butyl-9-fluorenyl)zirconium dichloride, [($\eta^5$-C$_5$H$_4$)CCH$_3$(CH$_2$CH$_2$CH$_2$CH=CH$_2$)($\eta^5$-9-C$_{13}$H$_7$-2,7-$^t$Bu$_2$)]ZrCl$_2$;

phenyl-3-butenylmethylidene($\eta^5$-cyclopentadienyl)($\eta^5$-9-fluorenyl)zirconium dichloride, [($\eta^5$-C$_5$H$_4$)C(C$_6$H$_5$)(CH$_2$CH$_2$CH=CH$_2$)($\eta^5$-9-C$_{13}$H$_9$)]ZrCl$_2$;

phenyl-3-butenylmethylidene($\eta^5$-cyclopentadienyl)($\eta^5$-2,7-di-t-butyl-9-fluorenyl)zirconium dichloride, [($\eta^5$-C$_5$H$_4$)C(C$_6$H$_5$)(CH$_2$CH$_2$CH=CH$_2$)($\eta^5$-9C$_{13}$H$_7$-2,7-$^t$Bu$_2$)]ZrCl$_2$;

phenyl-4-pentenylmethylidene($\eta^5$-cyclopentadienyl)($\eta^5$-9-fluorenyl)zirconium dichloride, [($\eta^5$-C$_5$H$_4$)C(C$_6$H$_5$)(CH$_2$CH$_2$CH$_2$CH=CH$_2$)($\eta^{2-5}$-9-C$_{13}$H$_9$)]ZrCl$_2$;

phenyl-4-pentenylmethylidene($\eta^5$-cyclopentadienyl)($\eta^5$-2,7-di-t-butyl-9-fluorenyl)zirconium dichloride, [($\eta^5$-C$_5$H$_4$)C(C$_6$H$_5$)(CH$_2$CH$_2$CH$_2$CH=CH$_2$)($\eta^5$-9-C$_{13}$H$_7$-2,7-$^t$Bu$_2$)]ZrCl$_2$; and the like.

In yet another aspect of this invention, examples of the metallocene that are useful in the catalyst composition of this invention include a compound with the formula I:

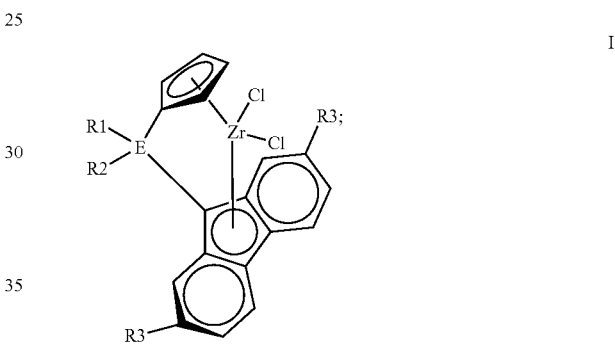

wherein E is selected from C, Si, Ge, or Sn; R1 is selected from H or a hydrocarbyl group having from 1 to about 12 carbon atoms; R2 is selected from an alkenyl group having from about 3 to about 12 carbon atoms; and R3 is selected from H or a hydrocarbyl group having from 1 to about 12 carbon atoms.

In another aspect, the catalyst composition of this invention comprises a metallocene compound described by structure II as follows:

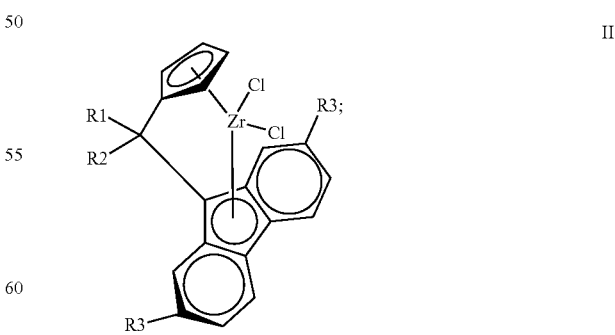

wherein R1 is selected from methyl or phenyl; R2 is selected from 3-butenyl (—CH$_2$CH$_2$CH=CH$_2$) or 4-pentenyl (—CH$_2$CH$_2$CH$_2$CH=CH$_2$); and R3 is selected from H or t-butyl.

Typically, the organometal compound comprises bis(n-butylcyclopentadienyl)zirconium dichloride; bis(indenyl)zirconium dichloride; dimethylsilylbis(1-indenyl) zirconium dichloride; methyloctylsilylbis(9-fluorenyl)zirconium dichloride; or bis(2,7-di-tert-butylfluorenyl)-ethan-1,2-diyl) zirconium(IV) dichloride.

The Organoaluminum Compound

In one aspect, the present invention provides catalyst compositions comprising at least one metallocene compound, at least one organoaluminum compound, at least one olefin or alkyne, and at least one acidic activator-support. In another one aspect, the metallocene compound and the organoaluminum compound are precontacted with the olefin or alkyne to form a precontacted mixture, prior to contacting this precontacted mixture with the acidic activator-support. Typically, a portion of the organoaluminum compound is added to the precontacted mixture and another portion of the organoaluminum compound is added to the postcontacted mixture, although all the organoaluminum compound may be used to prepare the catalyst in the precontacting step.

In another aspect of this invention, the precontacted mixture can comprise a first organoaluminum compound in addition to at least one metallocene and an olefin or acetylene monomer, and the postcontacted mixture can comprise a second organoaluminum compound in addition to the precontacted mixture and the acidic activator-support. The second organoaluminum compound can be the same or different from the first organoaluminum compound. Specifically, any of the possible first organoaluminum compounds may also be used as choices for the second organoaluminum compound, however not all of the possible second organoaluminum compounds work well as choices for the first organoaluminum compound for use in the precontacted mixture.

In yet another aspect, the first organoaluminum compound that can be used in this invention in the precontacted mixture with the metallocene compound and an olefin or alkyne monomer includes, but is not limited to, a compound having the following general formula:

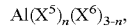

wherein ($X^5$) is a hydrocarbyl having from 2 to about 20 carbon atoms, and ($X^6$) is selected from alkoxide or aryloxide, any one of which having from 1 to about 20 carbon atoms, halide, or hydride; and n is a number from 1 to 3, inclusive. In one aspect, ($X^5$) is an alkyl having from 2 to about 10 carbon atoms, and in another aspect, ($X^5$) is selected from ethyl, propyl, n-butyl, sec-butyl, isobutyl, hexyl, and the like.

The substituent ($X^6$) in the formula for the first organoaluminum compound is selected from alkoxide or aryloxide, any one of which having from 1 to about 20 carbon atoms, halide, or hydride. In one aspect, ($X^6$) is independently selected from fluoro or chloro, and in another aspect, ($X^6$) is chloro.

In the formula $Al(X^5)_n(X^6)_{3-n}$ for the first organoaluminum compound, n is a number from 1 to 3 inclusive, and typically, n is 3. The value of n is not restricted to be an integer, therefore this formula includes sesquihalide compounds.

In yet another aspect, the second organoaluminum compound that can be used in the postcontacted mixture, that is, in the subsequent contacting of the precontacted components with additional organoaluminum compound and the activator-support, includes, but is not limited to, a compound having the following general formula:

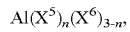

wherein ($X^5$) is a hydrocarbyl having from 1 to about 20 carbon atoms, and ($X^6$) is selected from alkoxide or aryloxide, any one of which having from 1 to about 20 carbon atoms, halide, or hydride; and n is a number from 1 to 3, inclusive. In one aspect, ($X^5$) is an alkyl having from 1 to about 10 carbon atoms, and in another aspect, ($X^5$) is selected from methyl, ethyl, propyl, n-butyl, sec-butyl, isobutyl, hexyl, and the like.

The substituent ($X^6$) in the formula for the second organoaluminum compound is selected from alkoxide or aryloxide, any one of which having from 1 to about 20 carbon atoms, halide, or hydride. In one aspect, ($X^6$) is independently selected from fluoro or chloro, and in another aspect, ($X^6$) is chloro.

In the second organoaluminum compound formula $Al(X^5)_n(X^6)_{3-n}$, n is a number from 1 to 3 inclusive, and typically, n is 3. The value of n is not restricted to be an integer, therefore this formula includes sesquihalide compounds.

Generally, examples of organoaluminum compounds that can be used in this invention include, but are not limited to, trialkylaluminum compounds, dialkylaluminium halide compounds, alkylaluminum dihalide compounds, alkylaluminum sesquihalide compounds, and combinations thereof. Specific examples of organoaluminum compounds that can be used in this invention in the precontacted mixture with the organometal compound and an olefin or alkyne monomer include, but are not limited to, triethylaluminum (TEA); tripropylaluminum; diethylaluminum ethoxide; tributylaluminum; diisobutylaluminum hydride; triisobutylaluminum; and diethylaluminum chloride.

When the precontacted mixture comprises a first organoaluminum compound and the postcontacted mixture comprises a second organoaluminum compound, any of the possible first organoaluminum compounds may also be used as choices for the second organoaluminum compound. However, not all of the possible second organoaluminum compounds work well for use in the precontacted mixture. For example, triethyl aluminum (TEA) works well in both precontacted and postcontacted mixtures, however trimethyl aluminum (TMA) works well only in the postcontacted mixture and not well in the precontacted mixture. In this example, organoaluminum compounds that can be used as the second organoaluminum compound in the postcontacted mixture include, but are not limited to, all the compounds that can be used in the precontacted mixture, and further including trimethylaluminum (TMA).

The amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. Triethylaluminum (TEA) is a typical compound used in this aspect of this invention when only a single organoaluminum compound is employed.

The Olefin or Acetylene Monomer

In the present invention, at least one organoaluminum compound, at least one metallocene compound, and at least one olefin or alkyne monomer are precontacted prior to contacting this mixture with a solid acidic activator-support, in order to afford an active polymerization catalyst.

Unsaturated reactants that are useful in the precontacting step and in the polymerization processes with catalyst compositions of this invention include olefin compounds having from about 2 to about 30 carbon atoms per molecule and having at least one olefinic double bond. This invention encompasses homopolymerization processes using a single olefin, as well as copolymerization reactions with at least one different olefinic compound. Typically, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal (α), internal, linear, branched, substituted, unsubstituted, functionalized, and non-functionalized olefins may be employed in this invention. For example, typical unsaturated compounds that can be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

Acetylenes may be also polymerized according to this invention. Acyclic, cyclic, terminal, internal, linear, branched, substituted, unsubstituted, functionalized, and non-functionalized alkynes may be employed in this invention. Examples of alkynes that can be polymerized include, but are not limited to, diphenylacetylene, 2-butyne, 2-hexyne, 3-hexyne, 2-heptyne, 3-heptyne, 2-octyne, 3-octyne, 4-octyne, and the like.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

The Solid Acidic Activator-Support

The present invention provides catalyst compositions comprising at least one metallocene compound, at least one organoaluminum compound, at least one olefin or alkyne, and at least one acidic activator-support. In one aspect, the metallocene compound and the organoaluminum compound are precontacted with the olefin or alkyne to form a precontacted mixture, prior to contacting this precontacted mixture with the acidic activator-support.

The present invention encompasses catalyst compositions comprising an acidic activator-support, methods for preparing catalyst compositions comprising an acidic activator-support, and methods for polymerizing olefins and acetylenes using these catalyst compositions. In this invention, the metallocene compound may be contacted with an olefinic or acetylenic monomer and an organoaluminum compound for a first period of time prior to contacting this mixture with the acidic activator-support. Once the precontacted mixture of metallocene, unsaturated monomer, and organoaluminum compound has been contacted with the acidic activator-support, this composition which further comprises the acidic activator-support is termed the "postcontacted" mixture. In one aspect, the postcontacted mixture may be further allowed to remain in contact for a second period of time prior to being charged into the reactor in which the polymerization process will be carried out. In another aspect, the postcontacted mixture may be charged into the reactor immediately after being prepared, or may be prepared directly in the reactor, and the polymerization reaction initiated immediately thereafter. In this aspect, the second period of time during which the postcontacted mixture is allowed to remain in contact is the minimal amount of time required to prepare the postcontacted mixture and initiate the polymerization process.

In one aspect, the present invention encompasses catalyst compositions comprising a chemically-treated solid oxide which serves as an acidic activator-support, and which is typically used in combination with an organoaluminum compound. In another aspect, the activator-support comprises at least one solid oxide treated with at least one electron-withdrawing anion; wherein the solid oxide is selected from silica, alumina, silica-alumina, aluminum phosphate, heteropolytungstates, titania, zirconia, magnesia, boria, zinc oxide, mixed oxides thereof, or mixtures thereof; and wherein the electron-withdrawing anion is selected from fluoride, chloride, bromide, phosphate, triflate, bisulfate, sulfate, or any combination thereof.

The activator-support includes the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The activator-support exhibits enhanced acidity as compared to the corresponding untreated solid oxide compound. The activator-support also functions as a catalyst activator as compared to the corresponding untreated solid oxide. While not intending to be bound by theory, it is believed that the activator-support may function as an ionizing solid oxide compound by completely or partially extracting an anionic ligand from the metallocene. However, the activator-support is an activator regardless of whether it is ionizes the metallocene, abstracts an anionic ligand to form an ion pair, weakens the metal-ligand bond in the metallocene, simply coordinates to an anionic ligand when it contacts the activator-support, or any other mechanisms by which activation may occur. While the activator-support activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the activator-support functions as an activator, even in the absence of an organoaluminum compound, aluminoxanes, organoboron compounds, or ionizing ionic compounds.

In one aspect, the activator-support of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina single chemical phases with more than one metal combined with oxygen to form a solid oxide compound, and are encompassed by this invention.

In one aspect of this invention, the activator-support further comprises a metal or metal ion selected from zinc, nickel, vanadium, silver, copper, gallium, tin, tungsten, molybdenum, or any combination thereof. Examples of activator-supports that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the activator-support of this invention comprises a solid oxide of relatively high porosity, which exhibits Lewis acidic or Brønsted acidic behavior. The solid oxide is chemically-treated with an electron-withdrawing component, typically an electron-withdrawing anion or an electron-withdrawing anion source, to form a activator-support. While not intending to be bound by the following statement, it is believed that treatment of the inorganic oxide with an electron-withdrawing component augments or enhances the acidity of the oxide. Thus, the activator-support exhibits Lewis or Brønsted acidity which is typically greater than the Lewis or Brønsted acidity of the untreated solid oxide. One method to quantify the acidity of the chemically-treated and untreated solid oxide materials is by comparing the polymerization activities of the treated and untreated oxides under acid catalyzed reactions. Generally, it is observed that the greater the electron-withdrawing ability or Lewis acidity of the activator-support, the greater its polymerization activity.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, and the like, including mixed oxides thereof, and combinations thereof. Examples of mixed oxides that can be used in the activator-support of the present invention include, but are not limited to, silica-alumina, silica-titania, silica-zirconia, zeolites, many clay minerals, alumina-titania, alumina-zirconia, and the like.

In one aspect of this invention, the solid oxide material is chemically-treated by contacting it with at least one electron-withdrawing anion, which may be derived from any electron-withdrawing component or an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion source compound derived from a salt, an acid, or other compound such as a volatile organic compound that may serve as a source or precursor for that anion. Examples of electron-withdrawing anions and electron-withdrawing anion sources include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired activator-support acidity. For example, one aspect of this invention is employing two or more electron-withdrawing anion source compounds in two or more separate contacting steps. Thus, one example of such a process by which an activator-support is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support is produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide or a chemically-treated solid oxide.

Another aspect of this invention producing or forming the solid oxide activator-support by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoboron compounds.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.01 cc/g. In another aspect, the solid oxide component has a pore volume greater than about 0.1 cc/g, and in yet another aspect, greater than about 1.0 cc/g. In still another aspect, the solid oxide component has a surface area from about 1 to about 1000 $m^2/g$. In another aspect, solid oxide component has a surface area from about 100 to about 800 $m^2/g$, and in still another aspect, from about 250 to about 600 $m^2/g$.

The solid oxide material may be treated with a source of halide ion or sulfate ion, or a combination of anions, and optionally treated with a metal ion, then calcined to provide the activator-support in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bisulfate-treated alumina; bromided silica-alumina, chlorided silica-alumina; fluorided silica-alumina; sulfated silica-alumina; bromided silica-zirconia, chlorided silica-zirconia; fluorided silica-zirconia; fluorided silica-titania; fluorided-chlorided alumina; sulfated silica-zirconia; chlorided zinc aluminate; chlorided tungsten aluminate; fluorided silica-boria; silica treated with fluoroborate; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the treated oxide activator-support comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4 PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic choriding agents may be used. Examples of volatile organic choriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the amount of fluoride or chloride ion present before calcining the solid oxide is from about 3 to about 25% by weight, and in another aspect, from about 4 to about 20% by weight. If the fluoride or chloride ion are added during calcining, such as when calcined in the presence of $CCl_4$, there is typically no fluoride or chloride ion in the solid oxide before calcining. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about 250 $m^2/g$, and in another aspect, the surface area may be greater than about 350 $m^2/g$. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

The amount of sulfate ion present before calcining is generally from about 1 to about 50% by weight, typically from about 5 to about 30% by weight, and more typically from about 10 to about 25% by weight, where the weight percents are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal selected from zinc, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the metallocene compound may be contacted with an olefin monomer and an organoaluminum cocatalyst for a first period of time prior to contacting this mixture with the acidic activator-support. Once the precontacted mixture of metallocene, monomer, organoaluminum cocatalyst is contacted with the acidic activator-support, the composition further comprising the acidic activator-support is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The Optional Aluminoxane Cocatalyst

In one aspect, the present invention provides a catalyst composition comprising at least one metallocene, at least one organoaluminum compound, at least one olefinic or acetylenic monomer, and at least one acidic activator-support, and further comprising an optional cocatalyst. In one aspect, the optional cocatalyst may be selected from at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

Aluminoxanes are also referred to as poly(hydrocarbyl aluminum oxides) or simply organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

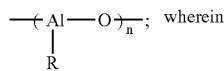; wherein

R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

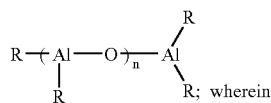; wherein

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_nAlR_2$, and the like, wherein the R group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R-Al-O)_n$ and $R(R-Al-O)_n AlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the alumixoane to the metallocene in the composition is usually from about 1:10 to about 100,000:1. In one another aspect, the molar ratio of the aluminum in the alumixoane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_q$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organoboron Cocatalyst

In one aspect, the present invention provides a catalyst composition comprising at least one metallocene, at least one organoaluminum compound, at least one olefinic or acetylenic monomer, and at least one acidic activator-support, and further comprising an optional cocatalyst. In one aspect, the optional cocatalyst may be selected from at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof.

Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form [cation]$^+$[BY$_4$]$^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In one aspect, the amount of fluoroorgano boron or fluoroorgano borate compound used as a cocatalyst for the metallocene is in a range of from about 0.8 mole to about 5 moles of boron compound per mole of metallocene compound.

The Optional Ionizing Ionic Compound Cocatalyst

In one aspect, the present invention provides a catalyst composition comprising at least one metallocene, at least one organoaluminum compound, at least one olefinic or acetylenic monomer, and at least one acidic activator-support, and further comprising an optional cocatalyst. In one aspect, the optional cocatalyst may be selected from at least one aluminoxane, at least one organoboron compound, at least one ionizing ionic compound, or any combination thereof. In another aspect, the optional cocatalyst may be used in the precontacting step, in the postcontacting step, or in both steps. Further, any combination of cocatalysts may be used in either step, or in both steps. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance activity of the catalyst composition. While not bound by theory, it is believed that the ionizing ionic compound may be capable of reacting with the metallocene compound and converting the metallocene into a cationic metallocene compound. Again, while not intending to be bound by theory, it is believed that the ionizing ionic compound may function as an ionizing compound by completely or partially extracting an anionic ligand, possibly a non-$\eta^5$-alkadienyl ligand such as ($X^3$) or ($X^4$), from the metallocene. However, the ionizing ionic compound is an activator regardless of whether it is ionizes the metallocene, abstracts an ($X^3$) or ($X^4$) ligand in a fashion as to form an ion pair, weakens the metal-($X^3$) or metal-($X^4$) bond in the metallocene, simply coordinates to an ($X^3$) or ($X^4$) ligand, or any other mechanisms by which activation may occur. Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)orate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis(phenyl) borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethyl)aluminate, tri(n-butyl)ammonium tetrakis(3,5-dimethylphenyl) aluminate, tri(n-butyl)ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis (pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis (pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetrakis(phenyl)aluminate, sodium tetrakis (p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, However, the ionizing ionic compound is not limited thereto in the present invention.

Preparation of the Catalyst Composition

In accordance with this invention, the catalyst compositions may be prepared by a process comprising precontacting an organoaluminum cocatalyst compound with an olefin or alkyne and an organometal compound for an effective period of time, before this mixture is contacted with the activator-support for an effective period of time. In one aspect, the process of preparing the catalyst of this invention may occur in an inert atmosphere and under substantially anhydrous conditions. Thus, the atmosphere is substantially oxygen-free and substantially free of water as the reaction begins, to prevent deactivation of the catalyst. In one aspect of this invention, for example, 1-hexene, triethylaluminum, and a zirconium metallocene, such as bis(indenyl)zirconium dichloride or bis(cyclopentadienyl)zirconium dichloride are precontacted for at least about 30 minutes prior to contacting this mixture with a fluorided silica-alumina activator-support. Once this precontacted mixture is brought into contact with the activator-support, this postcontacted mixture is allowed to remain in contact for from about 1 minute to about 24 hours, typically from about 5 minutes to about 5 hours, and more typically from about 10 minutes to about 1 hour, prior to using this mixture in a polymerization process.

Typically, the mixture of metallocene, olefin or alkyne monomer, and organoaluminum compound, before it is contacted with the activator-support, is termed the "precontacted" mixture. Accordingly, the components of the precontacted mixture are termed precontacted metallocene, precontacted olefin or alkyne monomer, and precontacted organoaluminum compound. The mixture of the precontacted mixture and the acidic activator-support, that is, the mixture of the metallocene, olefin or alkyne monomer, organoaluminum compound, and acidic activator-support, is typically termed the "postcontacted" mixture. Accordingly, the components of the postcontacted mixture are termed postcontacted metallocene, postcontacted olefin or alkyne monomer, postcontacted organoaluminum compound, and postcontacted acidic activator-support.

In one aspect of this invention, improved catalytic activities may be achieved when the precontacted mixture comprises various components other than the metallocene, olefin or alkyne monomer, and organoaluminum compound. In this aspect, the components of the precontacted mixture and the postcontacted mixture vary, such that the resulting catalyst composition can be tailored for the desired activity, or to accommodate a particular polymerization process.

The precontacting step may be carried out in a variety of ways, including but not limited to, blending. Furthermore, each of the organometal, monomer, and organoaluminum cocatalyst compounds can be fed into a reactor separately, or various combinations of these compounds can be contacted with each other before being further contacted in the reactor. Alternatively, all three compounds can be contacted together before being introduced into the reactor. Typically, the mixture of metallocene, alkene or alkyne, and organoaluminum compound was precontacted from minutes to days in a separate reactor, prior to contacting this mixture with activator-support to form the postcontacted mixture. This precontacting step is usually carried out under an inert atmosphere. Further, the precontacting step may be carried out with stirring, agitation, heating, cooling, sonication, shaking, under pressure, at room temperature, in an inert solvent (typically a hydrocarbon), and the like. However, such conditions are not necessary as the precontacting step may be carried out by simply allowing the components to stand substantially undisturbed.

In another aspect of this invention, the precontacted mixture is prepared first by contacting an organoaluminum compound, an olefin or acetylene, and an organometal (typically a metallocene) compound before injection into the reactor, typically for about 1 minute to about 9 days, more typically from about 1 minute to about 24 hours. The components of the precontacted mixture are generally contacted at a temperature from about 10° C. to about 200° C., typically from about 15° C. to about 80° C. This precontacted mixture is then placed in contact with the acidic activator-support, typically a fluorided silica-alumina activator-support as disclosed herein, to form the postcontacted mixture.

The postcontacted mixture is prepared by contacting and admixing the acidic activator-support and the precontacted mixture for any length of time and at any temperature and pressure that allows complete contact and reaction between the components of the postcontacted mixture. For example, this postcontacted mixture is usually allowed to remain in contact for from about 1 minute to about 24 hours, typically from about 5 minutes to about 5 hours, and more typically from about 10 minutes to about 1 hour, prior to using this mixture in a polymerization process. Once the acidic activator-support and the precontacted mixture have been in contact for a period of time, the composition comprises a post-contacted organometal compound (typically, a metallocene), a postcontacted organoaluminum compound, a postcontacted olefin or alkyne, and a postcontacted acidic activator-support (typically fluorided silica-alumina). Generally, the postcontacted acidic activator-support is the majority, by weight, of the composition. Often, the specific nature of the final components of a catalyst prepared as described herein are not known, therefore the catalyst composition of the present invention is described as comprising postcontacted compounds and components. Further, because the exact order of contacting can be varied, it is believed that this terminology is best to describe the composition's components.

In one aspect, the postcontacting step in which the precontacted mixture is placed in contact with the acidic activator-support is typically carried out in an inert atmosphere. Contact times between the acidic activator-support and the precontacted mixture typically range from time about 0.1 hour to about 24 hours, and from 0.1 to about 1 hours is more typical. The mixture may be heated to a temperature from between about 0° F. to about 150° F. Temperatures between about 40° F. to about 95° F. are typical if the mixture is heated at all. While not intending to be bound by theory, these conditions are thought to assist in the deposition of a catalytically-effective amount of the catalyst on the acidic activator-support.

In general, heating is carried out at a temperature and for a duration sufficient to allow adsorption, impregnation, or interaction of precontacted mixture and the acidic activator-support, such that a portion of the components of the precontacted mixture is immobilized, adsorbed, or deposited thereon. For example, in one aspect, a catalyst composition of this invention is prepared by contacting 1-hexene, triethylaluminum, and a zirconium metallocene, such as bis(indenyl)zirconium dichloride or bis(cyclopentadienyl)zirconium dichloride for at least about 30 minutes, followed by contacting this precontacted mixture with a fluorided silica-alumina activator-support for at least about 10 minutes up to one hour to form the active catalyst.

More than one metallocene can be used in the catalyst composition and methods of the present invention. When a catalyst composition comprises more than one metallocene, the metallocene compounds are employed in one or more precontacted mixtures. Thus, these multiple metallocenes may be employed in the same precontacted mixture and then used in the same postcontacted mixture, they can be employed in different precontacted mixtures which are then used to prepare the same postcontacted mixture, or they can be employed in different precontacted mixtures and different postcontacted mixtures which are then introduced into the polymerization reactor.

In one aspect, the molar ratio of the organometal or metallocene compound to the organoaluminum compound is about 1:1 to about 1:10,000, typically from about 1:1 to about 1:1,000, and more typically from about 1:1 to about 1:100. These molar ratios reflect the ratio of metallocene compound to the total amount of organoaluminum compound in both the precontacted mixture and the postcontacted mixture.

Generally, the molar ratio of olefin or alkyne monomer to organometal or metallocene compound in the precontacted mixture is about 1:10 to about 100,000:1, typically from about 10:1 to about 1,000:1.

In another aspect of this invention, the weight ratio of the acidic activator-support to the organoaluminum compound generally ranges from about 1:5 to about 1,000:1, typically from about 1:3 to about 100:1, and more typically from about 1:1 to about 50:1. In a further aspect of this invention, the weight ratio of the metallocene to the acidic activator-support is typically from about 1:1 to about 1:10,000,000, more typically from about 1:10 to about 1:100,000, even more typically from about 1:20 to about 1:1000. These ratios that involve the acidic activator-support are based on the amount of the components that have been added to make up the postcontacted mixture to provide the catalyst composition.

One aspect of this invention is that aluminoxane is not required to form the catalyst composition disclosed herein, a feature that allows lower polymer production costs. Accordingly, the present invention uses only $AlR_3$-type organoaluminum compounds which does not activate the metallocene catalyst in the same manner as an organoaluminoxane. Additionally, no expensive borate compounds or $MgCl_2$ are required to form the catalyst composition of this invention, although aluminoxane, borate compounds, $MgCl_2$, or combinations thereof can optionally be used in some aspects of this invention. However, another aspect of this invention is the use of optional cocatalysts, including, but not limited to, at least one aluminoxane, at least one organoboron compound, at least one ionizing ionic compound, or any combination thereof.

It is believed that the unexpected enhancements in the catalytic activity observed from precontacting certain catalyst components may be related to the formation of organoaluminum metallacyclic compounds, based upon the reported synthesis of aluminacyclopentanes (ACPs) according to the following reaction scheme, Scheme 1, using $(\eta^5\text{-}C_5H_5)_2ZrCl_2$, $AlEt_3$, and $CH_2\text{=}CHCH_2R$ ($R\text{=}C_3H_7$, $C_5H_{11}$, or $C_8H_{17}$), where $\eta^5\text{-}C_5H_5\text{=}Cp$.

Scheme 1

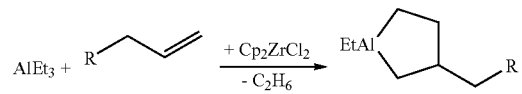

One reaction scheme to produce ACPs is described in: U. M. Dzhemilev and A. G. Ibragimov, *Journal of Organometallic Chemistry*, 1994, 466, 1-4, which, along with the references and citations referred to therein, each of which is incorporated by reference herein, in its entirety. Other reaction schemes to produce ACPs are described in Khalikov, L. M.; Parfenova, L. V.; Rusakov, S. V.; Ibragimov, A. G.; Dzhemilev, U. M. *Russian Chemical Bulletin, International Addition* 2000, 49, (12), 2051-2058. See also: Negishi, E.; Kondakov, Denis, Y.; Choueiry, D.; Kasai, K.; Takahashi, T. *Journal of the American Chemical Society* 1996, 118, 9577-9588, each of which is incorporated by referenced herein, in its entirety. According to Scheme 1, when the organometal (typically metallocene) compound and an organoaluminum compound are precontacted with an olefin, an aluminacyclopentane can form. While not intending to be bound by this statement, according to this reaction scheme and analogous reactions schemes described in Dzhemilev, U. M.; Ibragimov, A. G. *Russian Chemical Reviews* 2000, 69, (2) 121-135 when the organometal (typically metallocene) compound and an organoaluminum compound are precontacted with an alkyne, an aluminacyclopentene can form. A mixture of an olefin and an alkyne in the precontacted mixture would be expected to form an aluminacyclopentane and an aluminacyclopentene, in an analogous manner.

In accordance with Khalikov, L. M.; Parfenova, L. V.; Rusakov, S. V.; Ibragimov, A. G.; Dzhemilev, U. M. *Russian Chemical Bulletin, International Addition* 2000, 49, (12), 2051-2058, and the references and citations referred to therein, there are several possible mechanisms by which Scheme 1 can operate, one of which is presented in Scheme 2. Note that only one regioisomer of intermediate B is shown, leading to the aluminacyclopentane (ACP) regioisomer C shown.

Scheme 2

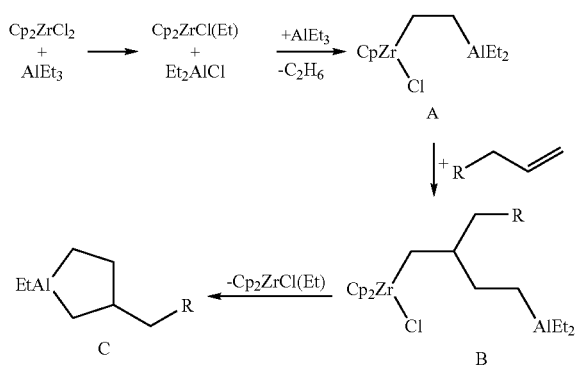

However, this scheme would also be expected to provide some of the α-substituted aluminacyclopentane, structure D, shown here:

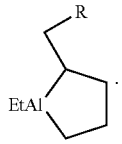

D

Thus, for any particular compound disclosed herein, any general structure presented also encompasses all isomers, including all regioisomers, that may arise from a particular set of substitutents or from a particular reaction scheme, as the context requires.

Another aspect of this invention is the catalyst composition comprising aluminacyclopentanes or metallacyclopentane of a metallocene, such as a zirconacyclopentanes. Thus, this invention encompasses a catalyst composition comprising a precontacted metallocene, a precontacted olefin or alkyne, a postcontacted acidic activator-support, and an aluminacyclopentane. This invention also encompasses a catalyst composition comprising a precontacted metallocene, a precontacted olefin or alkyne, a postcontacted acidic activator-support, and a metallacyclopentane or a metallacyclopentene of a metallocene.

Also, while not intending to be bound by theoretical statements, the reaction schemes above may also explain why triethylaluminum (TEA) works well to form the precontacted solution, while trimethylaluminum (TMA) does not. As indicated in Scheme 2, if the aluminum alkyl compound used in the precontacted mixture contains β-hydrogen atoms, these alkyl groups can participate in the β-H elimination process shown when coordinated to the organometal compound, thereby forming the zirconium-aluminum compound and the resulting zirconacyclopentane and ACP. The ethyl groups of TEA have β-hydrogen atoms while the methyl groups of TMA do not.

While not intending to be bound by the theory, it is believed that different aluminacyclopentanes (ACPs) can arise when two olefins are present in solution. For example, if both $CH_2=CHCH_2R$ and $CH_2=CH_2$ are present in solution, additional aluminacyclopentanes analogous to C and D are believed to be accessible in a precontact solution that contained both $CH_2=CHCH_2R$ and $CH_2=CH_2$ (regardless of whether the ethylene was introduced or was derived from $AlEt_3$), which could also give rise to the following aluminacyclopentanes E-H, derived from homocoupling of the same two olefins at a single metal site:

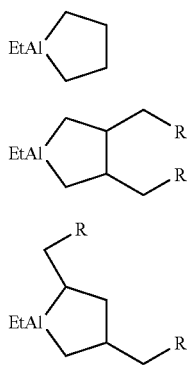

E

F

G

-continued

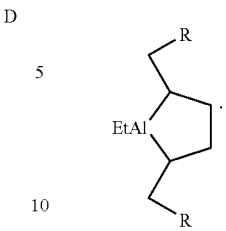

H

As illustrated in Scheme 2, these various aluminacyclopentanes would arise from the analogous zirconacyclopentanes.

In another aspect, this invention encompasses a catalyst composition that comprises a precontacted metallocene, a precontacted olefin or alkyne, a postcontacted acidic activator-support, and an aluminacyclopentane. Thus, the catalyst composition of this invention can comprise an aluminacyclopentane (E, F, G, H), an aluminacyclopentene (I), or an aluminacyclopentadiene (e.g., see Negishi, B.; Kondakov, Denis, Y.: Choueiry, D.; Kasai, K.: Takahashi, T. Journal of the American Chemical Society 1996. 118, 9577-9588, Scheme 17 cited above whether generated by the reaction schemes disclosed herein, or whether prepared independently. Similarly, this invention also encompasses a catalyst composition that comprises a precontacted metallocene, a precontacted olefin or alkyne, a postcontacted acidic activator-support, and a zirconacyclic species. As indicated in Scheme 2 and the references cited above, this cyclic organometal species can be a zirconacyclopentane (J) or a zirconacyclopentene (K) of any metallocene used in this invention, whether generated by the reaction schemes disclosed above,

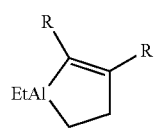

I

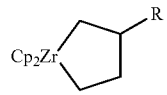

J

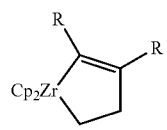

K or whether prepared independently.

The formation of an aluminacyclopentane upon precontacting a metallocene compound, an organoaluminum compound, and an olefin in the present invention was monitored by gas chromatography of the hydrolysis products of the aluminacyclopentane, as well as by gas (ethane) evolution when TEA is employed as the an organoaluminum compound. Accordingly, one aspect of this invention comprises preparing organoaluminum metallacyclic compounds, based upon the synthesis of aluminacyclopentanes reported in U. M. Dzhemilev and A. G. Ibragimov, *Journal of Organometallic Chemistry,* 1994, 466, 1-4, and using the reaction mixture comprising the aluminacyclopentanes in place of the precontacted mixture, according to the present reaction.

In another aspect of this invention, the components of the precontacted mixture and the postcontacted mixture vary, such that the resulting catalyst composition can be tailored for the desired activity, or the method of preparing the catalyst composition can accommodate the desired polymerization process. For example, in one aspect, the catalyst composition of this invention comprises a precontacted metallocene, a precontacted organoaluminum compound, a postcontacted olefin or alkyne, and a postcontacted acidic activator-support. In another aspect, the catalyst composition of this invention comprises a precontacted metallocene, a postcontacted organoaluminum compound, a precontacted olefin or alkyne, and a postcontacted acidic activator-support. In a further aspect, the catalyst composition of this invention comprises a precontacted metallocene, a postcontacted organoaluminum compound, a precontacted olefin or alkyne, and a precontacted acidic activator-support. In yet another aspect, the catalyst composition of this invention comprises a precontacted metallocene, a precontacted olefin or alkyne, a postcontacted acidic activator-support, and an aluminacyclopentane or aluminacyclopentene. In each of these aspects in which the components of the precontacted or postcontacted mixtures vary, the relative amounts of each component in the precontacted or postcontacted mixtures are typically within the same ranges as those disclosed here for the catalyst composition comprising a precontacted metallocene, a precontacted organoaluminum compound, a precontacted olefin or alkyne, and a postcontacted acidic activator-support.

Utility of the Catalyst Composition in Polymerization Processes

In one aspect, catalyst composition of this invention can have an activity greater than a catalyst composition that uses the same components, but does not involve precontacting the organometal compound, the organoaluminum compound, and an olefin or alkyne monomer.

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

In one aspect, polymerization temperature for this invention may range from about 60° C. to about 280° C., and in another aspect, polymerization reaction temperature may range from about 70° C. to about 110° C.

In another aspect, the polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

In still another aspect, the pretreatment pressure can be any pressure that does not terminate the pretreatment step, and typically is selected from a pressure that is suitable for the formation of organoaluminum metallacyclic compounds such as aluminacyclopentanes (ACPs), upon precontacting the metallocene, organoaluminum compound, and an olefin. Pretreatment pressures are typically, but not necessarily, lower than polymerization pressures, and generally range from about atmospheric pressure to about 100 psig. In one aspect, pretreatment pressures are from about atmospheric pressure to about 50 psig.

In yet another aspect, the polymerization reaction pressure can be any pressure that does not terminate the polymerization reaction, and it typically conducted at a pressure higher than the pretreatment pressures. In one aspect, polymerization pressures may be from about atmospheric pressure to about 1000 psig. In another aspect, polymerization pressures may be from about 50 psig to about 800 psig. Further, hydrogen can be used in the polymerization process of this invention to control polymer molecular weight.

When a copolymer of ethylene is prepared according to this invention, comonomer is introduced into the reaction zone in sufficient quantity to produce the desired polymer composition. A typical copolymer composition is generally from about 0.01 to about 10 weight percent comonomer based on the total weight of the monomer and comonomer, however this copolymer composition varies outside this range depending upon the copolymer specification and desired composition. Thus, any amount of copolymer sufficient to give the described polymer composition in the copolymer produced can be used.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. In one aspect, for example, a stirred reactor can be utilized for a batch process, or the reaction can be carried out continuously in a loop reactor or in a continuous stirred reactor. In another aspect, for example, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

In another aspect of this invention, the catalyst can be made in a variety of methods, including, but not limited to, continuously feeding the catalyst components directly into the polymerization reactor, including at least one optional precontacting step of some or all the catalyst components prior to introducing them into the reactor. In this aspect, each optional precontacting steps can involve precontacting for a different time period. In this aspect, the invention can encompass multiple, optional precontacting steps, for multiple time periods, prior to initiating the polymerization reaction. Further, these multiple, optional precontacting steps can take place in at least one precontacting vessel prior to introducing the precontacted components into the reactor, they can take place in the polymerization reactor itself, or any combination thereof, including the use of multiple precontacting vessels comprising different catalyst components. Thus, in this aspect, any precontacting steps can encompass precontacting of any combination of catalyst components, including any optional catalyst components. Also in this aspect, the multiple, optional precontacting steps can involve different precontacting time periods.

In another aspect of this invention, the catalyst can be made by continuously feeding the catalyst components into any number of optional precontacting vessels and subsequently introducing the components continuously into the reactor. In one aspect, for example, the present invention provides a process to produce a catalyst composition, comprising:

contacting at least one metallocene, at least one organoaluminum compound, and at least one olefin or alkyne for a first period of time to form a precontacted mixture comprising at least one precontacted metallocene, at least one precontacted organoaluminum compound, and at least one precontacted olefin or alkyne; and contacting the precontacted mixture with at least one acidic activator-support for a second period of time to form a postcontacted mixture comprising at least one postcontacted metallocene, at least one postcontacted organoaluminum compound, at least one postcontacted olefin or alkyne, and at least one postcontacted acidic activator-support.

In another aspect, for example, the present invention provides a process to produce a catalyst composition, comprising:

contacting at least two catalyst components selected from at least one metallocene, at least one organoaluminum compound, at least one olefin or alkyne, or at least one acidic activator-support for a first period of time to form a precontacted mixture comprising precontacted catalyst components; and contacting the precontacted mixture with any catalyst components not used to form the precontacted mixture, and optionally contacting the precontacted mixture with additional catalyst components selected from at least one metallocene, at least one organoaluminum compound, at least one olefin or alkyne, or at least one acidic activator-support for a second period of time to form a postcontacted mixture comprising at least one postcontacted metallocene, at least one postcontacted organoaluminum compound, at least one postcontacted olefin or alkyne, and at least one postcontacted acidic activator-support.

In another aspect, each ingredient can be fed to the reactor, either directly or through at least one precontacting vessel, using known feeding, measuring, and controlling devices, such as pumps, mass and volumetric flow meters and controllers, and the like. Feed-back signals and control loops can be used in connection with this continuous catalyst formation and introduction. The mass flow meter can be a coriolis-type meter adapted to measure a variety of flow types such as from a positive displacement-type pump with three heads. Other types of pumps, meters, and combinations of similar types of devices can be used as means for feed and control to measure and control a feed rate of a catalyst component. Various combinations of means for feed and control can also be used for each respective component depending upon the type of component, chemical compatibility of the component, and the desired quantity and flow rate of the component, and as well known to one of ordinary skill in the art. For example, a suitable meter for means for feed and control can be, but is not limited to, a thermal mass flow meter, a volumetric flow meter such as an orifice-type, diaphragm-type, a level-type meter, or the like.

In another aspect, the catalyst components can be combined in a variety or different orders and combinations prior to being introduced into the polymerization reactor. In one aspect, for example, the metallocene can be precontacted with an aluminum alkyl and an olefin in a first precontacting vessel, for a first precontacting time, for example, up to 7-10 days, to form a first precontacted solution. This first precontacted solution can then be fed to a second precontacting vessel along with the treated solid oxide component, and optionally more aluminum alkyl, for a second precontacting time. In this aspect, for example, the second precontacting time can be shorter, longer, or the same as the first precontacting time. For example, the second precontacting time can be about 0.5 hour, after which the "postcontacted" mixture can be fed from the second precontacting vessel directly into the reactor itself. In another aspect of this invention, all of the catalyst components can be brought together in the precontacting vessel for the first period of time, prior to being introduced directly into the reactor.

In another aspect, a portion of each catalyst component can be fed into the reactor directly, while the remainder is fed into a precontacting vessel. In this aspect, for example, it is sometimes desirable to limit the exposure of the metallocene or treated solid oxide to the aluminum alkyl, in which case only a small amount of aluminum alkyl can be introduced into the precontacting vessel, either alone or from a solution also containing the olefin and metallocene, while the remainder of the aluminum alkyl can be fed directly into the reactor. Likewise, the amount of olefin fed as part of the catalyst preparation may be fed from multiple sources. For example, 1-hexene may be added to the metallocene solution in a first precontacting step to form a first precontacted solution, more 1-hexene may be added separately in a second precontacting step to form a second precontacted solution, and still more 1-hexene may be added directly to the reactor. Similarly any of the other catalyst components can also be added in multiple steps to the entire reactor system.

After the polymers are produced, they can be formed into various articles, including but not limited to, household containers, utensils, film products, drums, fuel tanks, pipes, geomembranes, and liners. Various processes can form these articles. In one aspect, additives and modifiers can be added to the polymer in order to provide particular desired effects.

Definitions

In order to more clearly define the terms used herein, the following definitions are provided. To the extent that any definition or usage provided by any document incorporated herein by reference conflicts with the definition or usage provided herein, the definition or usage provided herein controls.

The term polymer is used herein to mean homopolymers comprising ethylene, copolymers of ethylene and another olefinic comonomer, or any combination thereof. The term polymer is also used herein to mean homopolymers and copolymers of acetylenes.

The term cocatalyst is used herein to refer to the at least one organoaluminum compound that constitutes a component of the catalyst mixture. Typical cocatalysts are trialkyl aluminum compounds, dialkyl aluminum halide compounds, and alkyl aluminum dihalide compounds. The term cocatalyst may be used regardless of the actual function of the compound or any chemical mechanism by which the compound may operate.

The term inert atmosphere is used herein to refer to any type of ambient atmosphere that is substantially unreactive toward the particular reaction, process, or material around which the atmosphere surrounds or blankets. Thus, this term is typically used herein to refer to the use of a substantially oxygen-free and moisture-free blanketing gas, including but not limited to dry argon, dry nitrogen, dry helium, or mixtures thereof, when any precursor, component, intermediate, or product of a reaction or process is sensitive to particular gases or moisture. Additionally, inert atmosphere is also used herein to refer to the use of dry air as a blanketing atmosphere when the precursors, components, intermediates, or products of the reaction or process are only moisture-sensitive and not oxygen-sensitive. However, inert atmosphere as used herein would typically exclude $CO_2$ or CO because these gases would be expected to be reactive toward the particular reaction, process, or material around which they would surround or blanket, despite their occasional use as inert blanketing gases in other processes.

The term precontacted mixture is used herein to describe a first mixture of catalyst components that are contacted for a first period of time prior to the first mixture being used to form a postcontacted or second mixture of catalyst components that are contacted for a second period of time. In one aspect of the invention, the precontacted mixture describes a mixture of metallocene, olefin or alkyne monomer, and organoaluminum compound, before this mixture is contacted with the acidic activator-support and optionally an organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is admixed with the metallocene and the olefin or alkyne monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term postcontacted mixture is used herein to describe a second mixture of catalyst components that are contacted for a second period of time, and one constituent of which is the precontacted or first mixture of catalyst components that were contacted for a first period of time. Typically, the term postcontacted mixture is used herein to describe the mixture of metallocene, olefin or alkyne monomer, organoaluminum compound, and acidic activator-support, formed from contacting the precontacted mixture of a portion of these components with the any additional components added to make up the postcontacted mixture. Generally, the additional component added to make up the postcontacted mixture is the acidic activator-support, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term metallocene is used herein to refer to metallocene and metallocene-like compounds containing at least one $\eta^5$-alkadienyl ligand, in one aspect at least one $\eta^5$-cycloalkadienyl ligand, and in another aspect at least one $\eta^5$-cyclopentadienyl ligand, or its analogs or derivatives. Thus, the metallocenes of this invention typically comprise at least one cyclopentadienyl, indenyl, fluorenyl, or boratabenzene ligand, or substituted derivatives thereof. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene may be referred to simply as the "catalyst", in much the same way the term "cocatalyst" may be used herein to refer to an organoaluminum compound.

The terms catalyst composition, catalyst mixture, and the like are used herein to refer to either the precontacted mixture or the postcontacted mixture as the context requires. The use of these terms does not depend upon the actual product of the reaction of the components of the mixtures, the nature of the active catalytic site, or the fate of the aluminum cocatalyst, metallocene compound, olefin or alkyne monomer used to prepare the precontacted mixture, or the specific reactions of the acidic activator-support after combining these components. Therefore, the terms catalyst composition, catalyst mixture, and the like include both heterogeneous compositions and homogenous compositions.

The term hydrocarbyl is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms solid acidic activator-support, acidic activator-support, or simply activator-support, and the like are used herein to indicate a treated, solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, in one aspect, the treated solid oxide compound comprises the calcined contact product of at least one solid oxide compound with at least one electron-withdrawing anion source compound. In another aspect, the activator-support or "treated solid oxide compound" comprises at least one ionizing, acidic solid oxide compound. The terms support or activator-support are not used to imply these components are inert, and this component should not be construed as an inert component of the catalyst composition.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substitutents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen or argon. Solvents were purchased from commercial sources and were typically dried over activated alumina prior to use. Unless otherwise specified, reagents were obtained from commercial sources.

EXAMPLE 1

Preparation of a Fluorided Silica-Alumina Acidic Activator-Support

The silica-alumina used to prepare the fluorided silica-alumina acidic activator-support in this Example was obtained from W. R. Grace as Grade MS13-110, containing 13% alumina, having a pore volume of about 1.2 cc/g and a surface area of about 400 m$^2$/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The thus-fluorided silica-alumina samples were then calcined as follows. About 10 grams of the alumina were placed in a 1.75-inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 450° C. At this temperature, the silica-alumina was allowed to fluidize for three hours in the dry air. Afterward, the silica-alumina was collected and stored under dry nitrogen, and was used without exposure to the atmosphere.

EXAMPLE 2

Preparation of a Precontacted/Postcontacted Catalyst Composition and Comparison of its Polymerization Activity with a Standard Catalyst Composition The present invention was tested in a comparative study of a catalyst composition comprising bis(cyclopentadienyl) zirconium dichloride catalyst, triethylaluminum (TEA), monomer (ethylene) and comonomer (1-hexene), and acidic activator-support (fluorided silica-alumina), both with and without the precontacting step of the metallocene, TEA, and 1-hexene. The data obtained in this study are provided in Table 1, using an acidic activator-support of fluorided silica alumina.

A stock solution of 45 mg of bis(cyclopentadienyl)zirconium dichloride in 45 mL of dry, degassed toluene was prepared for the experiments of Table 1. Control Example 2A of Table 1 represents polymerization data obtained from the near simultaneous contacting of 5 mL of the bis(cyclopentadienyl)zirconium dichloride stock solution, 200 mg of fluorided silica alumina, 1 mL of 15 wt % triethylaluminum (TEA) in heptane, 20 g of comonomer (1-hexene) and monomer (ethylene), without extended precontacting of any catalyst components.

The polymerization reaction was carried out in a 1-gallon autoclave as follows. Under an isobutane purge 5 mL of the bis(cyclopentadienyl)zirconium dichloride stock solution, immediately followed by 200 mg of support-activator, was charged to the autoclave. The autoclave was sealed, 2 liters of isobutane were added, along with 20 g of 1-hexene and 1 mL of 15 wt % triethylaluminum (TEA) in heptane. Stirring was initiated and maintained at about 700 rpm as the reactor was heated to 90° C. over a period of about 2 minutes. The total pressure was brought to 550 psig with ethylene. Ethylene was fed to the reactor on demand to maintain the pressure at 550 psig. After 1 hr, the stirrer and heating were then stopped and the reactor was rapidly depressurized. The autoclave was then opened and the solid polyethylene was physically removed. The activity values provided in Example 2A of Table 1 provide a baseline of catalyst and activator activity for comparison.

Example 2B of Table 1 demonstrates that precontacting bis(cyclopentadienyl)zirconium dichloride with 1-hexene and TEA prior to charging to the autoclave gave a catalyst that exhibited higher activity than that of Example 2A. Thus, 5 mL of the metallocene stock solution was treated with 2 mL of 1-hexene and 1 mL of 15 wt % TEA in heptanes. This solution was stirred for 30 minutes prior to charging to the autoclave. This precontacted solution was then charged to the 1 gallon autoclave immediately followed by 200 mg of the activator-support. The autoclave was then sealed and 2 L of isobutane, along with 20 g of 1-hexene, were quickly added to the reactor. Stirring was initiated and maintained at about 700 rpm as the reactor was heated to 90° C. over a period of about 2 minutes. The total pressure was brought to 550 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 550 psig. After 53 minutes, the stirrer and heating were then stopped and the reactor was rapidly depressurized. The autoclave was then opened and the solid polyethylene was physically removed. The reactor had substantially no indication of any wall scale, coating or other forms of fouling following the reaction.

TABLE 1

Polymerization Data Related to Precontact Time of Cp$_2$ZrCl$_2$ with TEA and 1-Hexene.

| Example | Precontact Time (min) | Activator-Support Weight (mg) | Catalyst. Weight (mg) | Run Time (min) | Solid Polymer (g) | Catalyst Activity (g/g/hr) | Activator-Support Activity (g/g/hr) |
| --- | --- | --- | --- | --- | --- | --- | --- |
| 2A | 0 | 200 | 5 | 60 | 328.1 | 65618 | 1640 |
| 2B | 30 | 200 | 5 | 53 | 517.9. | 117260 | 2932 |

EXAMPLE 3

Comparison of the Polymerization Activity of Catalyst Compositions Prepared by Varying the Components that are Precontacted and Postcontacted In Examples 3A-3D presented in Table 2, 1 mL of a 1 mg/1 mL toluene stock solution of bis(cyclopentadienyl) zirconium dichloride was optionally treated, in various combinations, with 1 mL of 15 wt % triethylaluminum, 2 mL of 1-hexene, and 200 mg of a fluorided silica-alumina activator-support for 30 minutes before introduction of this mixture to the polymerization autoclave. The stock solution was prepared under an atmosphere of nitrogen by dissolving 45 mg of bis(cyclopentadienyl)zirconium dichloride in 45 mL of dry toluene. Polymerizations were conducted for 60 minutes in isobutane at 90° C., 550 psig of ethylene, with 20 grams of 1-hexene. A "Yes" or "No" in Table 2 indicates the presence or absence of these reagents, respectively, in the precontacted mixture in the 30 minute period prior to introduction to the autoclave.

In Example 3A, 1 mL of 1 mg/mL toluene stock solution of bis(cyclopentadienyl)zirconium dichloride was treated with both 1 mL of 15 wt % trialkylaluminum in heptane and 2 mL of 1-hexene, under an atmosphere of nitrogen. This precontacted mixture composition containing these three reagents was stirred for 30 minutes before being charged to the autoclave. This precontacted solution was then charged to the 1 gallon autoclave immediately followed by 200 mg of the activator-support. The autoclave was then sealed and 2 L of isobutane, along with 20 g of 1-hexene, were quickly added to the reactor. Stirring was initiated and maintained at about 700 rpm as the reactor was heated to 90° C. over a period of about 2 minutes. The total pressure was brought to 550 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 550 psig. After 60 minutes, the stirrer and heating were then stopped and the reactor was rapidly depressurized. The autoclave was then opened and the solid polyethylene was physically removed. The reactor had substantially no indication of any wall scale, coating or other forms of fouling following the reaction.

In Example 3B, 1 mL of the 1 mg/1 mL toluene stock solution of bis(cyclopentadienyl)zirconium dichloride was treated only with 1 mL of 15 wt % triethylaluminum in the precontacted mixture. This precontacted mixture composition containing these two reagents was stirred for 30 minutes before being charged to the autoclave. This precontacted solution was then charged to the 1 gallon autoclave immediately followed by 200 mg of the activator-support. The autoclave was then sealed and 2 L of isobutane, along with 20 g of 1-hexene, were quickly added to the reactor. Stirring was initiated and maintained at about 700 rpm as the reactor was heated to 90° C. over a period of about 2 minutes. The total pressure was brought to 550 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 550 psig. After 60 minutes, the stirrer and heating were then stopped and the reactor was rapidly depressurized. The autoclave was then opened and the solid polyethylene was physically removed. The reactor had substantially no indication of any wall scale, coating or other forms of fouling following the reaction. This Example gave a lower activity than Example 3A.

In Example 3C, 1 mL of the 1 mg/1 mL toluene stock solution of bis(cyclopentadienyl)zirconium dichloride was treated only with 2 mL of 1-hexene in the pre-contacted mixture. This precontacted mixture composition containing these two reagents was stirred for 30 minutes before being charged to the autoclave. This precontacted solution was then charged to the 1 gallon autoclave immediately followed by 200 mg of the activator-support. The autoclave was then sealed and 2 L of isobutane, along with 20 g of 1-hexene and 1 mL of 15 wt % triethylaluminum, were quickly added to the reactor. Stirring was initiated and maintained at about 700 rpm as the reactor was heated to 90° C. over a period of about 2 minutes. The total pressure was brought to 550 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 550 psig. After 60 minutes, the stirrer and heating were then stopped and the reactor was rapidly depressurized. The autoclave was then opened and the solid polyethylene was physically removed. The reactor had substantially no indication of any wall scale, coating or other forms of fouling following the reaction. This Example gave a lower activity than Example 3A.

In Example 3D, 1 mL of the 1 mg/1 mL toluene stock solution of bis(cyclopentadienyl)zirconium dichloride was treated with 2 mL of 1-hexene and 200 mg of the activator-support in the pre-contacted mixture. This precontacted mixture composition containing these three reagents was stirred for 30 minutes before being charged to the autoclave. This precontacted slurry was then charged to the 1 gallon autoclave immediately followed by 200 mg of the activator-support. The autoclave was then sealed and 2 L of isobutane, along with 20 g of 1-hexene and 1 mL of 15 wt % triethylaluminum, were quickly added to the reactor. Stirring was initiated and maintained at about 700 rpm as the reactor was heated to 90° C. over a period of about 2 minutes. The total pressure was brought to 550 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 550 psig. After 60 minutes, the stirrer and heating were then stopped and the reactor was rapidly depressurized. The autoclave was then opened and the solid polyethylene was physically removed. The reactor had substantially no indication of any wall scale, coating or other forms of fouling following the reaction. This Example gave a lower activity than Example 3A.

TABLE 2

Polymerization Data Related to Components Present in the Precontacted Mixture Containing $Cp_2ZrCl_2$

| Example | Precontact Mixture Composition | | | Solid PE (g) | Catalyst Activity (g/g/hr) | Activator-Support Activity (g/g/hr) |
| --- | --- | --- | --- | --- | --- | --- |
| | TEA | 1-hexene | Activator-Support | | | |
| 3A | yes | yes | no | 309.3 | 309300 | 1547 |
| 3B | yes | no | no | 235.9 | 235900 | 1180 |
| 3C | no | yes | no | 177.6 | 177600 | 888 |
| 3D | no | yes | yes | 115.6 | 115600 | 578 |

These experiments demonstrate the higher activity for precontacting the metallocene with both 1-hexene and TEA in the absence of activator-support.

EXAMPLE 4

Activity of Catalysts Derived from Various Precontacted and Postcontacted Catalyst Compositions and Study of the Presence of the Activator-Support in the Precontacted Catalyst Composition Experiments 4A and 4B presented in Table 3 provide a comparison of catalyst compositions comprising the metallocene catalyst, bis(2,7-di-tert-butylfluorenyl)-ethan-1,2-diylzirconium(IV) dichloride, triethylaluminum (TEA), monomer (ethylene) and comonomer (1-hexene), and fluorided silica-alumina activator-support. A 1 mg metallocene/1 mL toluene stock solution (6 mL) was optionally treated with 1 mL of 15 wt % triethylaluminum, 2 mL of 1-hexene, and 200 mg of fluorided silica-alumina activator-support for 45 minutes before introduction to the polymerization autoclave, according to the data in Table 3. Thus, a "yes" or "no" entry in Table 3 indicates the presence of these reagents in a 45 minute precontact step with the metallocene, prior to introducing the precontacted mixture to the autoclave. Polymerizations were conducted for 60 minutes in isobutane at 80° C., 450 psig ethylene, with 20 grams of 1-hexene.

In Example 4A, under an atmosphere of nitrogen, 6 mL of 1 mg/mL toluene stock solution of the bis(2,7-di-tert-butylfluorenyl)-ethan-1,2-diylzirconium(IV) dichloride metallocene was treated with both 1 mL of 15 wt % trialkylaluminum in heptane and 2 mL of 1-hexene. This precontacted mixture composition containing these three reagents was stirred for 45 minutes before being charged to the autoclave. This precontacted solution was then charged to the 1 gallon autoclave immediately followed by 200 mg of the activator-support. The autoclave was then sealed and 2 L of isobutane, along with 20 g of 1-hexene, were quickly added to the reactor. Stirring was initiated and maintained at about 700 rpm as the reactor was heated to 80° C. over a period of about 2 minutes. The total pressure was brought to 450 psig with ethylene. Thus, the postcontacted mixture, containing the precontacted solution and the support activator, was allowed to remain in contact for a period of about 2 minutes prior to introducing ethylene. Ethylene was fed to the reactor on demand to maintain the pressure at 450 psig. After 60 minutes, the stirrer and heating were then stopped and the reactor was rapidly depressurized. The autoclave was then opened and the solid polyethylene was physically removed.

TABLE 3

Polymerization Data Related to Components and Conditions

| Example | Precontact Mixture Composition | | | Solid PE (g) | Catalyst Activity (g/g/hr) | Activator-Support Activity (g/g/hr) |
|---|---|---|---|---|---|---|
| | TEA | 1-hexene | Activator-Support | | | |
| 4A | yes | yes | no | 74.3 | 12383 | 743 |
| 4B | yes | yes | yes | 31.8 | 5300 | 318 |

In comparative Example 4B, the fluorided silica-alumina activator-support was present in the precontacted mixture along with the bis(2,7-di-tert-butylfluorenyl)-ethan-1,2-diylzirconium(IV) dichloride metallocene catalyst, triethylaluminum (TEA), and hexane comonomer. Thus, 6 mL of a 1 mg/mL toluene stock solution of metallocene was slurried with 1 mL of 15 wt % trialkylaluminum in heptane, 2 mL of 1-hexene, and 200 mg of the activator-support. This precontacted mixture containing all four catalyst components was stirred for 45 minutes before being charged to an autoclave. The autoclave was then sealed and 2 L of isobutane, along with 20 g of 1-hexene, were quickly added to the reactor. Stirring was initiated and maintained at about 700 rpm as the reactor was heated to 80° C. over a period of about 2 minutes. The total pressure was brought to 450 psig with ethylene. Ethylene was fed to the reactor on demand to maintain the pressure at 450 psig. After 60 minutes, the stirrer and heating were then stopped and the reactor was rapidly depressurized. The autoclave was then opened and the solid polyethylene was physically removed. As Table 3 indicates, the Example 4B catalyst exhibited a lower catalyst activity than the Example 4A catalyst.

EXAMPLE 5

Preparation of Various Precontacted and Postcontacted Catalyst Compositions and Comparison of their Polymerization Activities The Experiments presented in Table 4 provide a comparison of catalyst compositions comprising the metallocene catalyst, [$\eta^5$-cyclopentadienyl-$\eta^5$-(9-fluorenyl) hex-1-ene] zirconium dichloride, $CH_2=CHCH_2CH_2C(CH_3)(Cp)(9\text{-}Flu)ZrCl_2$, triethylaluminum (TEA), monomer (ethylene) and comonomer (1-hexene), and fluorided silica-alumina activator-support, both with and without the precontacting step of the metallocene, TEA, and 1-hexene. The metallocene catalyst in this example, $[(\eta^5\text{-}C_5H_4)CCH_3(CH_2CH_2CH=CH_2)(\eta^5\text{-}9\text{-}C_{13}H_9)]ZrCl_2$, has the following structure:

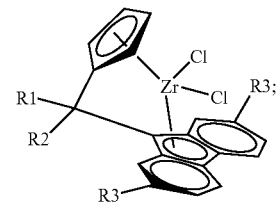

wherein R1 is methyl, R2 is butenyl ($—CH_2CH_2CH=CH_2$), and R3 is H.

Example 5A represents a standard catalytic run, that was obtained as follows. Under a nitrogen atmosphere, 2 mL of 1-hexene, 2 mL of a solution of catalyst solution prepared from [$\eta^5$-cyclopentadienyl-$\eta^5$-(9-fluorenyl) hex-1-ene] zirconium dichloride, $CH_2=CHCH_2CH_2C(CH_3)(Cp)(9\text{-}Flu)ZrCl_2$, in toluene (2 mg/mL), and 1 mL of 15 wt % triethylaluminum in heptane solution were added to a Diels-Alder tube. This solution was immediately added to 250 mg of activator-support—. Thus, Example 5A of Table 4 represents polymerization data obtained from the near simultaneous contacting of $CH_2=CHCH_2CH_2C(CH_3)(Cp)(9\text{-}Flu)ZrCl_2$, TEA, 1-hexene, and fluorided silica-alumina activator-support, without precontacting the ansa-metallocene, triethylaluminum (TEA), and 1-hexene, and therefore provides a baseline for comparison with Examples 5B and 5C.

Example 5B represents a catalytic run obtained in the same manner as the standard run of Example 5A, except that Example 5B included a precontacting step of 0.25 hours for the metallocene $CH_2=CHCH_2CH_2C(CH_3)(Cp)(9\text{-}Flu)$ ZrCl$_2$, TEA, and 1-hexene, prior to contacting this mixture with the fluorided silica-alumina activator-support.

Example 5C represents a catalytic run obtained in the same manner as the standard run of Example 5A, except that Example 5C included no precontacting of the metallocene, TEA, and 1-hexene, but instead included a "postcontacted" step (according to the definitions herein) of 0.50 hours in which all components, namely the metallocene CH$_2$=CHCH$_2$CH$_2$C(CH$_3$)(Cp)(9-Flu)ZrCl$_2$, TEA, 1-hexene, and the fluorided silica-alumina activator-support were contacted prior to adding this postcontacted mixture to the reactor. This example demonstrates that an increase in activity is obtained by precontacting the metallocene, TEA and hexane, whereas when all the reactants are contacted prior to initiating a polymerization run, a decrease in activity was observed.

Example 5D was prepared as follows. The metallocene catalyst CH$_2$=CHCH$_2$CH$_2$C(CH$_3$)(Cp)(9-Flu)ZrCl$_2$ (24 mg) was placed in a Diels-Alder tube and maintained in the dark by covering the tube with aluminum foil. A 12-mL sample of dry heptane (but no hexene) was added and this mixture was stirred while 2 mL of 15 wt % triethylaluminum in heptane was added. This slurry was stirred in the dark at room temperature for about 17 hours, to provide a light yellow solution. This sample was maintained in the dark until use. Example 5D included a "postcontacting" step of 0.25 hours for 2 mLs of this precontacted solution, 1 mL of 15 wt % TEA, and the fluorided silica-alumina activator-support prior to adding to the reactor. Example 5D provides a baseline for comparison of Examples 5E and 5F.

Example 5E was prepared as follows. The metallocene catalyst CH$_2$=CHCH$_2$CH$_2$C(CH$_3$)(Cp)(9-Flu)ZrCl$_2$ (24 mg) was placed in a Diels-Alder tube and maintained in the dark by covering the tube with aluminum foil. A 12-mL sample of 1-hexene was added and this mixture was stirred while 2 mL of 15 wt % triethylaluminum in heptane was added. This slurry was stirred in the dark at room temperature for about 17 hours, to provide a dark yellow solution in which all the catalyst had dissolved. This sample was maintained in the dark until use. This Example included a "postcontacting" step of 0.25 hours for 2 mLs of this solution, 1 mL of 15 wt % TEA, and the fluorided silica-alumina activator-support prior to adding to the reactor.

Example 5F was prepared as follows. The CH$_2$=CHCH$_2$CH$_2$C(CH$_3$)(Cp)(9-Flu)ZrCl$_2$ metallocene catalyst (10 mg) was placed in a Diels-Alder tube, to which 20 mL of 1-hexene and 2 mL of 15 wt % triethylaluminum in heptane were added. This mixture was maintained in the dark and the Diels-Alder tube was put in an ultra sonic bath and sonicated for about 10 minutes. A dark yellow solution was obtained in which all the catalyst had dissolved. This sample was maintained in the dark until use. This Example included a "postcontacting" step of 0.25 hours for 4 mLs of this solution, 1 mL of 15 wt % TEA, and the fluorided silica-alumina activator-support prior to adding to the reactor. Examples 5E and 5F show that a large increase in activity is obtained by precontacting the metallocene, TEA and 1-hexene compared to Example 5D, where 1-hexene was excluded.

Polymerization reactions were carried out as follows. Following any precontact and postcontact steps for a particular sample, a catalyst slurry (comprising metallocene, organoaluminum, olefin, and activator-support) was added to a 1-gallon autoclave under an isobutane purge. The autoclave was sealed, 2 liters of isobutane were added, and stirring was initiated and maintained at about 700 rpm. The reactor was quickly heated to 80° C. over a period of about 2 minutes. A 25-g sample of 1-hexene was forced into the reactor, and the total pressure was brought to 450 psig with ethylene. Ethylene was fed to the reactor on demand to maintain the pressure at 450 psig for 1 hour. The stirrer and heating were then stopped and the reactor was rapidly depressurized. The autoclave was then opened and the solid polyethylene was physically removed.

TABLE 4

Polymerization Data Related to Components and Conditions

| Example | Precontact Time (hours)[1] | Postcontact Time (hours)[2] | Run Time (min) | Catalyst Weight (g) | Solid Polymer (g) | Productivity (g/g) | Catalyst Activity (g/g/hr) | Activator-Support Activity (g/g/hr) |
|---|---|---|---|---|---|---|---|---|
| 5A | 0 | ~0 | 65 | 0.004 | 96.6 | 24150 | 22292 | 357 |
| 5B | 0.25 | 0 | 49[3] | 0.004 | 94.5 | 23625 | 28929 | 463 |
| 5C | 0 | 0.5 | 64 | 0.004 | 46.6 | 11650 | 10922 | 175 |
| 5D | 17[4] | 0.25[4] | 60 | 0.0034 | 80.6 | 23706 | 23706 | 322 |
| 5E | 17[5] | 0.25 | 60 | 0.0034 | 319.7 | 94029 | 94029 | 1279 |
| 5F | 0.17[6] | 0.25 | 65 | 0.0018 | 294.7 | 151128 | 151128 | 1088 |

[1]Precontact Time is defined as the contact time of the metallcene CH$_2$=CHCH$_2$CH$_2$C(CH$_3$)(Cp)(9-Flu)ZrCl$_2$, triethylaluminum (TEA), and 1-hexene, which forms the precontacted mixture.
[2]Postcontact Time is defined as the contact time between all four components, the metallcene CH$_2$=CHCH$_2$CH$_2$C(CH$_3$)(Cp)(9-Flu)ZrCl$_2$, triethylaluminum (TEA), 1-hexene, and fluorided silica-alumina activator-support. This also represents the contact time between precontacted mixture and the fluorided silica-alumina activator-support.
[3]Because the polymerization rate was decreasing at the end of the 49 minute run, the activity (g/g/hr) extrapolated to a per hour basis constitutes an overestimate of the activity.
[4]Neither the precontacted nor the postcontacted mixture contained any olefin monomer. Thus, the precontacted mixture contains the metallocene CH$_2$=CHCH$_2$CH$_2$C(CH$_3$)(Cp)(9-Flu)ZrCl$_2$,triethylaluminum (TEA), and heptane, but no 1-hexene. The postcontacted mixture contains the precontacted mixture, additional triethylaluminum (TEA), and fluorided silica-alumina.
[5]Precontacted mixture maintained in the dark.
[6]Precontacted mixture sonicated while maintaining in the dark.

In Table 4, Productivity is the g of polymer/g of catalyst produced during that run, Catalyst Activity is the g of polymer/g of catalyst/unit time, and is a better comparison among runs, and Activator-Support Activity is the g of polymer/g of activator-support/unit time.

EXAMPLE 6

Larger Scale Production of Polyethylene Resin Using the Precontacted/Postcontacted Catalyst Composition In this Example, the pretreated metallocene catalyst of the present invention was used in the experimental production of 0.931 density (specification range 0.930 to 0.933) polyethylene resin to demonstrate the capability of the catalyst system to produce polyethylene polymer in larger scale production.

Ethylene polymers were prepared in a continuous particle form process (also known as a slurry process) by contacting a catalyst with a monomer and optionally one or more α-olefin comonomers, such as 1-hexene. The medium and temperature are thus selected such that the copolymer is produced as solid particles and is recovered in that form. Ethylene that had been dried over activated alumina and/or molecular sieves was used as the monomer. Isobutane that had been degassed by fractionation and dried over alumina and/or molecular sieves was used as the diluent.

The reactor was a liquid-full 22.5-inch inside diameter pipe loop having a volume of 27,000 gallons. Liquid isobutane was used as the diluent, and the reactor pressure was about 600 psig. The loop reactor was equipped with continuous take-off (CTO) and settling leg product take-off (PTO), which can be operated in combination. The slurry discharge of polymer and isobutane along with unreacted ethylene and 1-hexene from the reactor went though a heated flashline into a low pressure flash tank and through a purge column to remove residual hydrocarbons. To prevent static buildup in the reactor, a small amount (<5 ppm of diluent) of a commercial antistatic agent sold as Stadis 450 was added.

The catalyst system comprised the following components. The metallocene bis(indenyl)zirconium dichloride ($\eta^5$-$C_9H_7$)$_2$ZrCl$_2$, 1-hexene diluent, and triethylaluminum (TEA) were precontacted for a period of about 9 days in a first premixing pot, prior to being introduced into a second "premixing" vessel. After this time, the metallocene-olefin-TEA mixture constituting one feed, the activator-support slurried in isobutane constituting a second feed, and additional triethylaluminum (TEA) in isobutane constituting a third feed were introduced into the second "premixing" vessel to form the postcontacted mixture, according this invention, before introduction into the loop reactor. Once introduced in this second premixing vessel to form the postcontacted mixture, this mixture was stirred with a residence time of approximately 28 minutes, prior to introduction into the loop reactor.

The metallocene bis(indenyl)zirconium dichloride concentration was approximately 1 part per million of the reactor concentration. The total TEA added was approximately 10 part per million of the reactor concentration. The solid activator-support component, was dehydrated in a fluidized bed at 950° F. to 1000° F., then charged to the conventional catalyst metering vessel used for chromium catalyst and metered through a 35 or 49-cc feeder into the second premixing vessel.

Typical and approximate reactor conditions for this experimental run were: 190° F. reactor temperature, 5.5 to 7.0 weight percent ethylene measured in the off-gas from the low pressure flash chamber via on-line gas chromatography, 3.5 to 4.5 weight percent 1-hexene measured in the off-gas from the low pressure flash chamber via on-line gas chromatography, no hydrogen, and reactor solids up to 38 weight percent.

The reactor was operated to have a residence time of 45 minutes to 1.5 hours. At steady state conditions, the isobutane feed rate was about 30,000 to 36,000 pounds per hour, the ethylene feed rate was about 30,000 to 34,000 pounds per hour, and the 1-hexene feed rate was varied to control the density of the polymer product. Ethylene concentration in the diluent was 5 to 7 weight percent. Catalyst concentrations in the reactor can be such that the catalyst system content ranges from 0.001 to about 1 weight percent based on the weight of the reactor contents. Polymer was removed from the reactor at the rate of about 33,000 to 37,000 pounds per hour and recovered in a flash chamber.

We claim:

1. A catalyst composition comprising:
   at least one precontacted unbridged metallocene;
   at least one precontacted organoaluminum compound;
   at least one precontacted olefin or alkyne; and
   at least one postcontacted acidic activator-support, wherein the postcontacted acidic activator-support comprises fluorided silica-alumina.

2. The catalyst composition of claim 1, wherein the fluorided silica-alumina comprises from about 5% to about 95% by weight alumina and from about 2% to about 50% by weight fluoride ion, based on the weight of the fluorided silica-alumina after drying but before calcining.

3. The catalyst composition of claim 1, wherein the fluorided silica-alumina comprises silica-alumina having a pore volume greater than about 0.5 cc/g, and a surface area greater than about 100 m$^2$/g.

4. The catalyst composition of claim 1, wherein the precontacted unbridged metallocene comprises a compound having the following formula:

$$(X^1)(X^2)(X^3)(X^4)M^1,$$

wherein $M^1$ is selected from titanium, zirconium, or hafnium;

wherein $(X^1)$ is independently selected from cyclopentadienyl, indenyl, fluorenyl, boratabenzene, substituted cyclopentadienyl, substituted indenyl, substituted fluorenyl, or substituted boratabenzene;

wherein each substituent on the substituted cyclopentadienyl, substituted indenyl, substituted fluorenyl or substituted boratabenzene of $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

wherein $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;

wherein $(X^2)$ is independently selected from a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and wherein each substituent on the substituted ($X^2$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

5. The catalyst composition of claim 1, wherein the precontacted unbridged metallocene comprises a metallocene compound selected from:
bis(cyclopentadienyl)hafnium dichloride;
bis(cyclopentadienyl)zirconium dichloride;
bis(n-butylcyclopentadienyl)bi s(t-butylamido)hafnium;
bis(1-n-butyl-3-methyl-cyclopentadienyl)zirconium dichloride;
bis(n-butylcyclopentadienyl)zirconium dichloride;
indenyl diethoxy titanium(JV) chloride;
bis(pentamethylcyclopentadienyl)zirconium dichloride;
bis(indenyl) zirconium dichloride; or
bis-[1-(N,N-diisopropylamino)boratabenzene]hydridozirconium trifluoromethyl sulfonate.

6. The catalyst composition of claim 1, wherein the precontacted organoaluminum compound comprises an organoaluminum compound with the following formula:

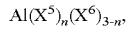

wherein ($X^5$) is a hydrocarbyl having from 2 to about 20 carbon atoms; ($X^6$) is selected from alkoxide or aryloxide, any one of which having from 1 to about 20 carbon atoms, halide, or hydride; and n is a number from 1 to 3, inclusive.

7. The catalyst composition of claim 1, wherein the precontacted organoaluminum compound comprises triethylaluminum (TEA), tripropylaluminum, diethylaluminum ethoxide, tributylaluminum, diisobutylaluminum hydride, triisobutylaluminum, diethylaluminum chloride, or combinations thereof.

8. The catalyst composition of claim 1, further comprising at least one postcontacted organoaluminum compound with the following formula:

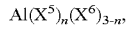

wherein ($X^5$) is a hydrocarbyl having from 1 to about 20 carbon atoms; ($X^6$) is selected from alkoxide or aryloxide, any one of which having from 1 to about 20 carbon atoms, halide, or hydride; and n is a number from 1 to 3, inclusive.

9. The catalyst composition of claim 1, wherein the precontacted olefin or alkyne comprises a compound having from 2 to about 30 carbon atoms per molecule and having at least one carbon-carbon double bond or at least one carbon-carbon triple bond.

10. The catalyst composition of claim 1, wherein the precontacted unbridged metallocene comprises bis(indenyl) zirconium dichloride or bis(cyclopentadienyl)-zirconium dichloride; the precontacted organoaluminum compound comprises triethylaluminum; the precontacted olefin comprises 1-hexene; and the postcontacted acidic activator-support comprises fluorided silica-alumina.

11. The catalyst composition of claim 1, wherein the precontacted organoaluminum compound comprises an aluminacyclopentane, an aluminacyclopentadiene, or an aluminacyclopentene.

12. The catalyst composition of claim 1, wherein the mole ratio of the metallocene to the organoaluminum compound is from about 1:1 to about 1:10,000.

13. The catalyst composition of claim 1, wherein the mole ratio of the olefin or alkyne to the metallocene in the precontacted mixture is from about 1:10 to about 100,000:1.

14. The catalyst composition of claim 1, wherein the weight ratio of the metallocene to the acidic activator-support is from about 1:1 to about 1:1,000,000.

15. The catalyst composition of claim 1, wherein the weight ratio of the acidic activator-support to the organoaluminum compound is from about 1:5 to about 1000:1.

16. A process to produce a catalyst composition, comprising:
contacting at least one unbridged metallocene, at least one organoaluminum compound, and at least one olefin or alkyne for a first period of time to form a precontacted mixture comprising at least one precontacted metallocene, at least one precontacted organoaluminum compound, and at least one precontacted olefin or alkyne; and
contacting the precontacted mixture with at least one acidic activator-support for a second period of time to form a postcontacted mixture comprising at least one postcontacted metallocene, at least one postcontacted organoaluminum compound, at least one postcontacted olefin or alkyne, and at least one postcontacted acidic activator-support,
wherein the postcontacted acidic activator-support comprises fluorided silica-alumina.

17. The process of claim 16, wherein the metallocene, the organoaluminum compound, and the olefin or alkyne are precontacted for a first period of time from about 1 minute to about 9 days in the precontacted mixture.

18. The process of claim 16, wherein the precontacted mixture and the acidic activator-support are contacted for a second period of time from about 1 minute to about 24 hours in the postcontacted mixture.

19. The process of claim 16, wherein the precontacted unbridged metallocene comprises a metallocene compound with the following formula:

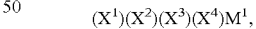

wherein $M^1$ is selected from titanium, zirconium, or hafnium;
wherein ($X^1$) is independently selected from cyclopentadienyl, indenyl, fluorenyl, boratabenzene, substituted cyclopentadienyl, substituted indenyl, substituted fluorenyl, or substituted boratabenzene;
wherein each substituent on the substituted cyclopentadienyl, substituted indenyl, substituted fluorenyl or substituted boratabenzene of ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

wherein ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;

wherein ($X^2$) is independently selected from a cyclopentadienyl group, an indenyl group, a fluorenyl group, a boratabenzene group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and wherein each substituent on the substituted ($X^2$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen.

20. The process of claim 16, wherein the precontacted unbridged metallocene comprises a metallocene compound selected from:
  bis(cyclopentadienyl)hafnium dichloride;
  bis(cyclopentadienyl)zirconium dichloride;
  bis(n-butylcyclopentadienyl)bis(t-butylamido)hafnium;
  bis(1-n-butyl-3-methyl-cyclopentadienyl)zirconium dichloride;
  bis(n-butylcyclopentadienyl)zirconium dichloride;
  indenyl diethoxy titanium(IV) chloride;
  bis(pentamethylcyclopentadienyl)zirconium dichloride;
  bis(indenyl) zirconium dichloride; or
  bis-[1-(N,N-diisopropylamino)boratabenzene]hydridozirconium trifluoromethylsulfonate.

21. The process of claim 16, wherein the precontacted organoaluminum compound comprises an organoaluminum compound with the following formula:

$Al(X^5)_n(X^6)_{3-n}$, wherein ($X^5$) is a hydrocarbyl having from 2 to about 20 carbon atoms; ($X^6$) is selected from alkoxide or aryloxide, any one of which having from 1 to about 20 carbon atoms, halide, or hydride; and n is a number from 1 to 3, inclusive.

22. The process of claim 16, wherein the precontacted organoaluminum compound comprises triethylaluminum (TEA), tripropylaluminum, diethylaluminum ethoxide, tributylaluminum, diisobutylaluminum hydride, triisobutylaluminum, diethylaluminum chloride, or combinations thereof.

23. The process of claim 16, further comprising contacting the precontacted mixture and the acidic activator-support with at least one postcontacted organoaluminum compound with the following formula:

$Al(X^5)_n(X^6)_{3-n}$, wherein ($X^5$) is a hydrocarbyl having from 1 to about 20 carbon atoms; ($X^6$) is selected from alkoxide or aryloxide, any one of which having from 1 to about 20 carbon atoms, halide, or hydride; and n is a number from 1 to 3, inclusive, for a second period of time, to form a postcontacted mixture comprising at least one postcontacted metallocene, at least one postcontacted organoaluminum compound, at least one postcontacted olefin or alkyne, and at least one postcontacted acidic activator-support.

24. The process of claim 16, wherein the precontacted olefin or alkyne comprises a compound having from 2 to about 30 carbon atoms per molecule and having at least one carbon-carbon double bond or at least one carbon-carbon triple bond.

25. The process of claim 16, wherein the fluorided silica-alumina comprises from about 5% to about 95% by weight alumina and from about 2% to about 50% by weight fluoride ion, based on the weight of the fluorided silica-alumina after drying but before calcining.

26. The process of claim 16, wherein the fluorided silica-alumina comprises silica-alumina having a pore volume greater than about 0.5 cc/g, and a surface area greater than about 100 m$^2$/g.

27. The process of claim 16, wherein the precontacted unbridged metallocene comprises bis(indenyl)zirconium dichloride or bis(cyclopentadienyl)zirconium dichloride; the precontacted organoaluminum compound comprises triethylaluminum; the precontacted olefin comprises 1-hexene; and the postcontacted acidic activator-support comprises fluorided silica-alumina.

28. The process of claim 16, wherein the precontacted organoaluminum compound comprises an aluminacyclopentane, an aluminacyclopentadiene, an aluminacyclopentene, or any combination thereof.

* * * * *